United States Patent
Kawazoe et al.

(10) Patent No.: US 11,115,464 B2
(45) Date of Patent: Sep. 7, 2021

(54) SERVER APPARATUS, INFORMATION PROCESSING METHOD, AND COMPUTER PROGRAM PRODUCT

(71) Applicant: Kabushiki Kaisha Toshiba, Minato-ku (JP)

(72) Inventors: Hiroshi Kawazoe, Kawasaki (JP); Daisuke Ajitomi, Setagaya (JP); Keisuke Minami, Kawasaki (JP); Koji Tazoe, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 472 days.

(21) Appl. No.: 15/426,572

(22) Filed: Feb. 7, 2017

(65) Prior Publication Data

US 2017/0366602 A1 Dec. 21, 2017

(30) Foreign Application Priority Data

Jun. 21, 2016 (JP) .............................. JP2016-122926

(51) Int. Cl.
*H04L 29/08* (2006.01)
*H04L 29/06* (2006.01)

(52) U.S. Cl.
CPC .............. *H04L 67/10* (2013.01); *H04L 67/26* (2013.01); *H04L 67/303* (2013.01); *H04L 67/42* (2013.01)

(58) Field of Classification Search
CPC .... H04L 43/0817; H04L 43/16; H04L 41/065
See application file for complete search history.

(56) References Cited

U.S. PATENT DOCUMENTS 7,082,463 B1 * 7/2006 Bradley .............. H04L 41/5003
  709/223
7,467,192 B1 * 12/2008 Lemler ............... H04L 41/5006
  709/220

(Continued)

FOREIGN PATENT DOCUMENTS

JP  2015-170286  9/2015
JP  2015-170296  9/2015

(Continued)

OTHER PUBLICATIONS

JP,2015-192449,A—Machine translation (Year: 2015).*

*Primary Examiner* — Douglas B Blair
(74) *Attorney, Agent, or Firm* — Oblon, McClelland, Maier & Neustadt, L.L.P.

(57) ABSTRACT

According to an embodiment, a server apparatus includes a first reception unit, a second reception unit, a classification unit, a second criterion selection unit, a group determination unit, and an individual determination unit. The second criterion selection unit selects, for each group and as a second criterion, a first criterion that is most likely to satisfy from among first criteria that are associated with pieces of identification information of first client apparatuses included in the group. The group determination unit determines whether first acquired data satisfies a second criterion for the group including a first client apparatus that has transmitted the first acquired data. The individual determination unit performs an individual determination process that determines whether the first acquired data satisfying the second criterion satisfies the first criterion associated with the identification information of the first client apparatus that has transmitted the first acquired data satisfying the second criterion.

11 Claims, 18 Drawing Sheets

(56) References Cited

U.S. PATENT DOCUMENTS

| | | | |
|---|---|---|---|
| 8,489,610 B2* | 7/2013 | Kan | G06F 16/30 707/741 |
| 8,578,275 B2* | 11/2013 | Brolley | G06Q 30/0282 715/738 |
| 2003/0149526 A1* | 8/2003 | Zhou | G01S 5/0027 701/408 |
| 2007/0220516 A1* | 9/2007 | Ishiguro | G06F 9/505 718/101 |
| 2010/0064297 A1* | 3/2010 | Doll | G05B 19/042 719/315 |
| 2010/0131952 A1* | 5/2010 | Akiyama | G06F 11/0748 718/100 |
| 2010/0235390 A1* | 9/2010 | Sano | G06F 16/2423 707/770 |
| 2010/0305721 A1* | 12/2010 | Kostadinov | G05B 19/0426 700/87 |
| 2012/0066684 A1* | 3/2012 | Takami | G06F 9/5083 718/102 |
| 2012/0317266 A1* | 12/2012 | Abbott | G06Q 30/0278 709/224 |
| 2013/0042000 A1* | 2/2013 | Machida | G06F 9/5083 709/224 |
| 2013/0226856 A1* | 8/2013 | Zhang | G06N 7/005 706/52 |
| 2013/0346973 A1* | 12/2013 | Oda | G06F 9/4856 718/1 |
| 2014/0237426 A1* | 8/2014 | Terazono | G06F 3/04817 715/810 |
| 2015/0256622 A1 | 9/2015 | Kawazoe et al. | |
| 2016/0142477 A1 | 5/2016 | Kawazoe et al. | |
| 2016/0321594 A1* | 11/2016 | Linde | G06Q 10/06395 |
| 2017/0167746 A1* | 6/2017 | Harris | F24F 11/62 |

FOREIGN PATENT DOCUMENTS

| | | |
|---|---|---|
| JP | 2015-192449 | 11/2015 |
| JP | 2016-95645 | 5/2016 |

* cited by examiner

FIG.3

| GROUP ID | DEVICE ID |
|---|---|
| 0 | 000000 |
| 0 | 000010 |
| 0 | 000020 |
| 0 | 000030 |
| 0 | 000040 |
| 0 | 000050 |
| 0 | 000060 |
| 1 | 000001 |
| 1 | 000011 |
| ... | ... |

FIG.4

```
{
 "id": "000000",
 "value": 9000,
 "time": "2015-10-10T09:00:00Z"
}
```

FIG.5

| TIMESTAMP | DEVICE ID | ACQUIRED DATA |
|---|---|---|
| 2015-10-10T08:00:00Z | 000000 | 8000 |
| 2015-10-10T08:00:00Z | 000002 | 8000 |
| 2015-10-10T08:00:00Z | 000001 | 4000 |
| 2015-10-10T09:00:00Z | 000001 | 3000 |
| 2015-10-10T09:00:00Z | 000002 | 7000 |
| 2015-10-10T09:00:00Z | 000000 | 9000 |

FIG.6

```
{
 "id": "000000",
 "threshold": 15000
}
```

FIG.7

| DEVICE ID | CRITERION |
|---|---|
| 000000 | 15000 |
| 000001 | 13000 |
| 000002 | 12000 |
| 000003 | 17000 |
| 000004 | 18000 |
| ... | ... |

FIG.8

| GROUP ID | REPRESENTATIVE CRITERION |
|---|---|
| 0 | 16000 |
| 1 | 12000 |
| 2 | 12000 |
| 3 | 17000 |
| 4 | 16000 |
| 5 | 15000 |
| 6 | 15000 |
| 7 | 17000 |
| 8 | 19000 |
| 9 | 18000 |

FIG.14

| GROUP ID | REPRESENTATIVE ACQUIRED DATA |
|---|---|
| 0 | 9000 |
| 1 | 4000 |
| 2 | 13000 |
| 3 | 7000 |
| 4 | 15000 |
| 5 | 6000 |
| 6 | 5000 |
| 7 | 7000 |
| 8 | 9000 |
| 9 | 8000 |

SERVER APPARATUS, INFORMATION PROCESSING METHOD, AND COMPUTER PROGRAM PRODUCT

CROSS-REFERENCE TO RELATED APPLICATION

This application is based upon and claims the benefit of priority from Japanese Patent Application No. 2016-122926, filed on Jun. 21, 2016; the entire contents of which are incorporated herein by reference.

FIELD

Embodiments described herein relate generally to a server apparatus, an information processing method, and a computer program product.

BACKGROUND

Cases in which services are provided by cloud computing are now on the increase. For example, a virtual server (instance) created in a cloud environment provides services. Server management jobs, such as starting a new server, connecting a server to a network, and disabling a server that has developed a fault, are performed through operations on a cloud service administration screen. Use of an instance is typically charged by the hour. Thus, a system administrator can reduce service operating cost by dynamically adding (scaling out) and reducing (scaling in) instances depending on load conditions in an operating configuration that includes a plurality of server apparatuses.

Examples of services provided by the cloud computing include, but are not limited to, a notification given when time-series data received from a client apparatus satisfies a condition specified in advance by a user.

BRIEF DESCRIPTION OF THE DRAWINGS

FIG. 3 is a diagram illustrating exemplary information stored in a group information storage unit in the first embodiment;

FIG. 4 is a diagram illustrating exemplary reception data in the first embodiment;

FIG. 5 is a diagram illustrating exemplary information stored in an acquired data storage unit in the first embodiment;

FIG. 6 is a diagram illustrating exemplary reception data in the first embodiment;

FIG. 7 is a diagram illustrating exemplary information stored in a criterion storage unit in the first embodiment;

FIG. 8 is a diagram illustrating exemplary information stored in a representative criterion storage unit in the first embodiment;

FIG. 14 is a diagram illustrating exemplary information stored in a representative acquired data storage unit in the second embodiment;

DETAILED DESCRIPTION

According to an embodiment, a server apparatus includes a first reception unit, a second reception unit, a classification unit, a second criterion selection unit, a group determination unit, and an individual determination unit. The first reception unit receives, from at least one first client apparatus, first reception data in which identification information for identifying the first client apparatus and first acquired data that is acquired by the first client apparatus are associated with each other. The second reception unit receives, from at least one second client apparatus, second reception data in which a first criterion for determining the first acquired data and the identification information are associated with each other. The classification unit classifies the at least one first client apparatus into at least one group. The second criterion selection unit selects, for each group and as a second criterion, a first criterion that is most likely to satisfy from among the first criteria that are associated with the pieces of identification information of the first client apparatuses included in the group. The group determination unit determines whether the first acquired data satisfies the second criterion for the group including the first client apparatus that has transmitted the first acquired data. The individual determination unit performs an individual determination process that determines whether the first acquired data satisfying the second criterion satisfies the first criterion associated with the identification information of the first client apparatus that has transmitted the first acquired data satisfying the second criterion.

Embodiments of a server apparatus, an information processing method, and a computer program will be described in details below with reference to the accompanying drawings.

First Embodiment

The following describes an exemplary configuration of apparatuses in an information processing system according to a first embodiment.

Configuration of Apparatuses in Information Processing System

Figure 1:
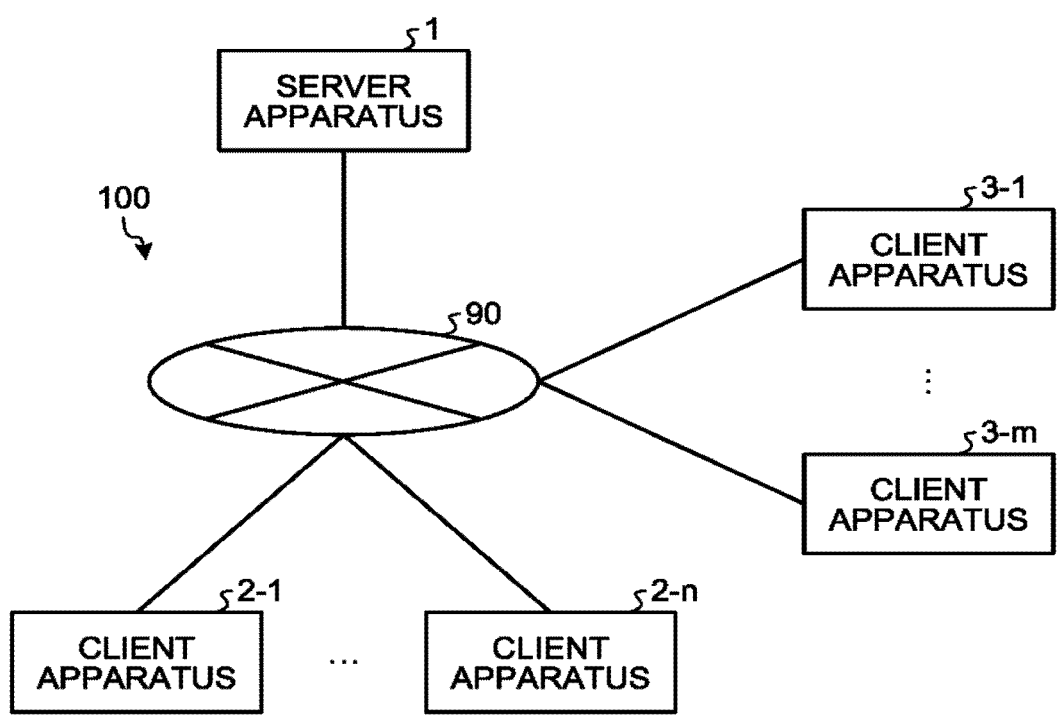
FIG. 1 is a diagram illustrating an exemplary configuration of apparatuses of an information processing system according to a first embodiment.

FIG. 1 is a diagram illustrating an exemplary configuration of apparatuses of this information processing system 100 according to the first embodiment. The information processing system 100 in the first embodiment includes a server apparatus 1, client apparatuses 2-1 to 2-$n$ (n is an integer equal to or greater than 1), and client apparatuses 3-1 to 3-$m$ (m is an integer equal to or greater than 1). The server apparatus 1, the client apparatuses 2-1 to 2-$n$, and the client apparatuses 3-1 to 3-$m$ are connected with each other via a network 90. It is noted that the network 90 may be a wired or wireless system. The network 90 may even be implemented by a combination of the wired system and the wireless system.

In the following, the client apparatuses 2-1 to 2-$n$ will be collectively called a client apparatus 2. Similarly, the client apparatuses 3-1 to 3-$m$ will be collectively called a client apparatus 3.

The server apparatus 1 receives, from the client apparatus 2, acquired data that has been acquired in a time-series manner. The acquired data that has been acquired in a time-series manner is, for example, numerical information representing a phenomenon that varies irregularly with time. The acquired data has a data format that is, for example, a combination of identification information of the client apparatus 2, one or more pieces of numerical information, and occurrence time-of-day of the numerical information. The server apparatus 1 stores the acquired data received from the client apparatus 2 in a permanent database that is implemented by, for example, a relational database. When the acquired data received from the client apparatus 2 satisfies a condition specified in advance, the server apparatus 1 notifies the client apparatus 3. Information notified by the server apparatus 1 may be any information. The information notified by the server apparatus 1 includes, for example, temperature and electricity usage acquired by the client apparatus 2.

The client apparatus 2 is a home electric appliance, a measuring instrument, an information acquiring device, and a gateway device that relays communication among the foregoing devices. The information acquiring device acquires information from another device via, for example, the network 90. The client apparatus 2 transmits the acquired data that has been acquired in a time-series manner to the server apparatus 1 regularly or irregularly.

The client apparatus 3 is a terminal device that includes a user interface, such as a portable device, a communication terminal, and a personal computer. A user may, for example, operate a user application that operates on the client apparatus 3 to thereby be able to acquire, from the server apparatus 1, the abovementioned acquired data and data indicating an operating state of the client apparatus 2, for example. Additionally, the client apparatus 3 may register, in the server apparatus 1, a criterion for determining the abovementioned acquired data to thereby receive a notification from the server apparatus 1 when the criterion is satisfied. The user of the client apparatus 3 thereby passively know, for example, the operating condition of, and fault detection in, the client apparatus 2.

Functional Configuration of Server Apparatus

Figure 2:
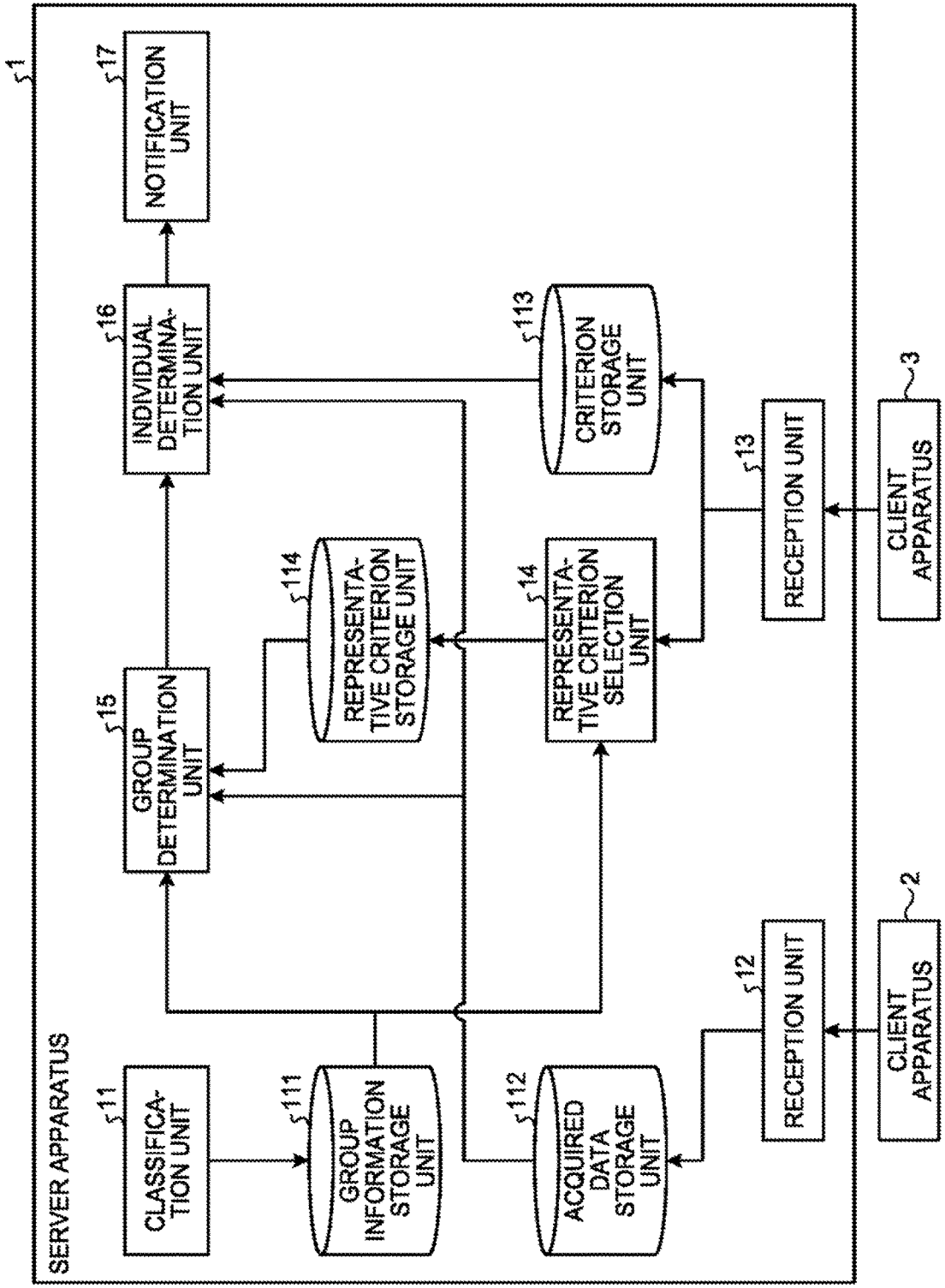
FIG. 2 is a diagram illustrating an exemplary functional configuration of a server apparatus in the first embodiment.

FIG. 2 is a diagram illustrating an exemplary functional configuration of the server apparatus 1 in the first embodiment. The server apparatus 1 in the first embodiment includes a classification unit 11, a reception unit 12, a reception unit 13, a representative criterion selection unit 14, a group determination unit 15, an individual determination unit 16, a notification unit 17, a group information storage unit 111, an acquired data storage unit 112, a criterion storage unit 113, and a representative criterion storage unit 114.

Storage of Group Information

The classification unit 11 classifies the client apparatuses 2-1 to 2-$n$ into one or more groups. The classification unit 11 then stores group information in the group information storage unit 111.

FIG. 3 is a diagram illustrating exemplary information stored in the group information storage unit 111 in the first embodiment. The group information storage unit 111 in the first embodiment stores therein group IDs and device IDs. The group ID is identification information that identifies a group. The device ID is identification information that identifies a client apparatus 2. In the example illustrated in FIG. 3, a client apparatus 2 identified by a device ID of 000001 is included in a group identified by a group ID of 1.

It is noted that any method may be taken to classify the client apparatuses into groups. The first embodiment will be described on the basis that the client apparatuses 2 are classified into ten groups and each client apparatus 2 belongs to any one of the groups. The group IDs in the first embodiment are integers ranging from 0 to 9. The example illustrated in FIG. 3 will be described for an exemplary case in which the classification unit 11 assumes that the last digit of the device ID is the group ID of a group to which the client apparatus 2 identified by that particular group ID belongs and the client apparatuses 2 are thereby classified into ten groups.

The group information storage unit 111 may be implemented by, for example, a nonvolatile storage device having a data format found in a file system, a relational database, an object database, and a time-series database.

Reception of Acquired Data

Reference is made back to FIG. 2. The reception unit 12, having received, from at least one client apparatus 2, reception data (first reception data) including acquired data acquired by the client apparatus 2, stores the acquired data in the acquired data storage unit 112.

FIG. 4 is a diagram illustrating exemplary reception data in the first embodiment. The reception unit 12 receives the reception data from the client apparatus 2 using, for example, an HTTP POST request having a payload illustrated in FIG. 4.

The item "id" indicates the device ID of the client apparatus 2. The device ID is, for example, a 6-digit integer.

The item "value" indicates the acquired data acquired by the client apparatus 2. It is noted that the acquired data may be any type of data. When the client apparatus 2 is a temperature measuring instrument or an electric power measuring instrument, for example, then the acquired data is a reading of the temperature measuring instrument or the electric power measuring instrument. Alternatively, when the client apparatus 2 is a premises gateway device of a home energy management system (HEMS), for example, then the acquired data is, for example, electricity usage of an electric appliance under control. The first embodiment will be described specifically for an exemplary case in which the acquired data is an instantaneous current amount (mA).

The item "time" represents a timestamp that indicates date and time of day at which the acquired data is acquired.

The exemplary reception data illustrated in FIG. 4 represents the acquired data (9000 (mA)) acquired by the client apparatus 2 that is identified by a device ID of 000000 at 9 o'clock on Oct. 10, 2015.

FIG. 5 is a diagram illustrating exemplary information stored in the acquired data storage unit 112 in the first embodiment. The acquired data storage unit 112 in the first embodiment stores therein timestamps, device IDs, and acquired data. The timestamp is a value of time included in the reception data. The device ID is a value of id included in the reception data. The acquired data is a value of "value" included in the reception data.

The acquired data storage unit 112 may be implemented by, for example, a nonvolatile storage device having a data format found in a file system, a relational database, an object database, and a time-series database.

Reception of Criterion

Reference is made back to FIG. 2. The reception unit 13, having received, from at least one client apparatus 3, reception data (second reception data) that includes a criterion for determining the acquired data acquired by the client apparatus 2, stores the criterion in the criterion storage unit 113.

FIG. 6 is a diagram illustrating exemplary reception data in the first embodiment. The server apparatus 1 discloses, for example, an HTTP API to the client apparatus 3 to thereby receive registration of a criterion from the client apparatus 3. In a case of using the HTTP API, the reception unit 1 receives, from the client apparatus 3, the reception data using, for example, the HTTP POST request having a payload illustrated in FIG. 6.

The item "id" indicates the device ID of the client apparatus 2. Specifically, the item "id" represents the client apparatus 2 to be determined using the criterion. The item "threshold" indicates the criterion of the acquired data acquired by the client apparatus 2. The first embodiment will be described for an exemplary case in which the criterion is a threshold (mA) of the instantaneous current amount.

The exemplary reception data illustrated in FIG. 6 represents that the criterion for the instantaneous current amount of the client apparatus 2 identified by a device ID of 000000 is 15000 (mA).

FIG. 7 is a diagram illustrating exemplary information stored in the criterion storage unit 113 in the first embodiment. The criterion storage unit 113 in the first embodiment stores therein the device IDs and the criteria. The device ID is a value of id included in the reception data. The criterion is a value of threshold included in the reception data.

The criterion storage unit 113 may be implemented by, for example, a nonvolatile storage device having a data format found in a file system, a relational database, an object database, and a time-series database.

Selection of Representative Criterion

The reception unit 13 inputs, to the representative criterion selection unit 14, the device ID (the value of id) included in the reception data and the criterion (the value of threshold) included in the reception data.

The representative criterion selection unit 14 selects, for each group and as a representative criterion (a second criterion), a criterion that is most likely to satisfy from among criteria (first criteria) that are associated with the pieces of identification information (device IDs) of the client apparatuses 2 included in the group. The representative criterion selection unit 14 then stores the representative criterion in the representative criterion storage unit 114.

The first embodiment is described, as noted previously, for an exemplary case in which the criterion is the threshold (mA) of the instantaneous current amount. Thus, the representative criterion selected as the criterion that is most likely to satisfy is a minimum threshold among thresholds for determining the instantaneous current amount of the client apparatuses 2 included in the same group, received so far by the reception unit 13.

FIG. 8 is a diagram illustrating exemplary information stored in the representative criterion storage unit 114 in the first embodiment. The representative criterion storage unit 114 in the first embodiment stores therein the group IDs and the representative criteria. The group ID is identification information that identifies a group. The representative criterion is a criterion used when the group determination unit 15 to be later described determines the acquired data that is acquired by the client apparatuses 2 included in an identical group.

Specifically, the representative criterion selection unit 14, having received the device ID and the criterion from the reception unit 13, searches the group information storage unit 111 using the device ID to thereby identify a specific group that includes the client apparatus 2 identified by the device ID. The representative criterion selection unit 14 next compares the representative criterion that is stored in the representative criterion storage unit 114 and is associated with the identified group with the criterion received from the reception unit 13. The representative criterion selection unit 14, on finding that the criterion received from the reception unit 13 is more likely to satisfy than the representative criterion that is stored in the representative criterion storage unit 114 is, updates the representative criterion of the representative criterion storage unit 114 with the criterion received from the reception unit 13.

The example of FIG. 8 illustrates that the representative criterion for a group ID of 0, for example, is 16000 (mA). In this case, when the reception unit 13 receives reception data that includes the device ID of the client apparatus 2 included in a group having the group ID of 0 and the criterion (15000), the representative criterion selection unit 14 updates the representative criterion for the group ID of 0 from 16000 to 15000. This is because of the following reason. Specifically, the criterion for determining whether the instantaneous current amount is equal to or greater than 15000 (mA) is more likely to satisfy than the criterion for determining whether the instantaneous current amount is equal to or greater than 16000 (mA) is.

The representative criterion storage unit 114 is implemented by, for example, a volatile storage device such as an in-memory database.

Determination of Acquired Data

Reference is made back to FIG. 2. The group determination unit 15 determines whether acquired data stored in the acquired data storage unit 112 satisfies the representative criterion for a group that includes the client apparatus 2 that has transmitted the acquired data.

Specifically, the group determination unit 15 reads the device ID and the acquired data from the acquired data storage unit 112. The group determination unit 15 next uses the group information storage unit 111 to identify the group ID of the group that is identified by the device ID read from the acquired data storage unit 112. The group determination unit 15 then reads the representative criterion associated with the identified group ID from the representative criterion storage unit 114. The group determination unit 15 determines whether the acquired data read from the acquired data storage unit 112 satisfies the representative criterion read from the representative criterion storage unit 114.

It is noted that the step of determining whether the acquired data satisfies the representative criterion may be performed at any timing. For example, the group determination unit 15 may determine whether the acquired data satisfies the representative criterion each time that the reception unit 12 receives acquired data from the client apparatus 2. Alternatively, the acquired data may be determined whether to satisfy the representative criterion by, for example, reading acquired data that is yet to be determined from the acquired data storage unit 112 at predetermined time intervals of one minute.

If the acquired data satisfies the representative criterion, the group determination unit 15 requests the individual determination unit 16 to perform an individual determination process.

The individual determination unit 16, having received the request for performance of the individual determination process from the group determination unit 15, reads, from the criterion storage unit 113, the criterion associated with the device ID of the client apparatus 2 that has transmitted the acquired data to be subjected to the individual determination process. The individual determination unit 16 determines whether the acquired data satisfying the representative criterion satisfies the criterion associated with the device ID of the client apparatus 2 that has transmitted the acquired data satisfying the representative criterion.

If the criterion is determined to be satisfied, the individual determination unit 16 requests the notification unit 17 to perform a notification process. The notification unit 17, having received the request for performance of the notification process from the individual determination unit 16, notifies a predetermined notification destination (e.g., the client apparatus 3 that has transmitted the criterion to the server apparatus 1) of notification information that indicates that the criterion satisfies.

Figure 9:
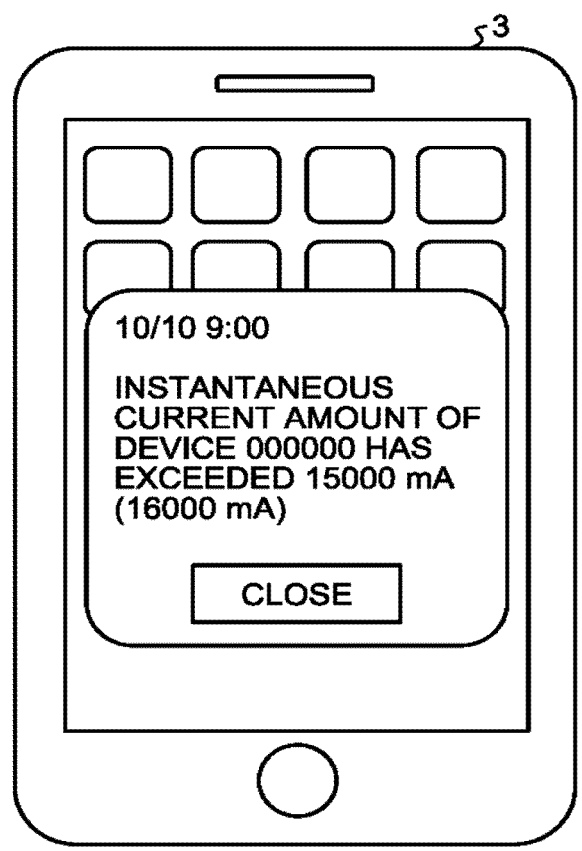
FIG. 9 is a diagram illustrating exemplary notification information in the first embodiment.

FIG. 9 is a diagram illustrating exemplary notification information in the first embodiment. The example of FIG. illustrates that the instantaneous current amount of a device having a device ID of 000000 has exceeded 15000 mA and that the client apparatus 3 has been notified of the instantaneous current amount (16000 mA) when 15000 mA was determined to be exceeded.

Information Processing Method

The following describes an exemplary information processing method in the first embodiment.

Method for Storing Criterion and Representative Criterion

Figure 10:
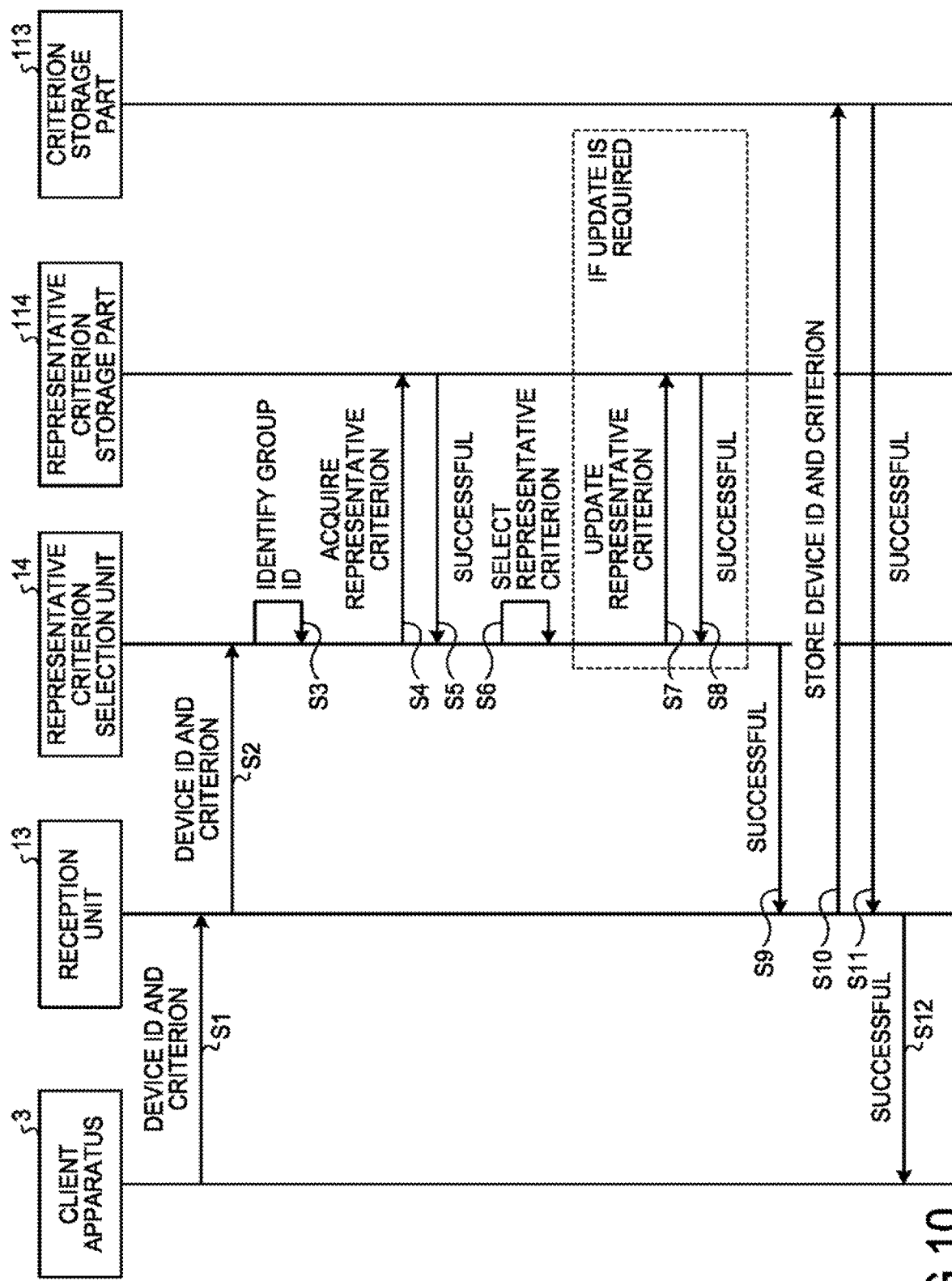
FIG. 10 is a sequence diagram illustrating an exemplary method for storing a criterion and a representative criterion in the first embodiment.

FIG. 10 is a sequence diagram illustrating an exemplary method for storing the criterion and the representative criterion in the first embodiment. The client apparatus 3 first transmits a device ID and a criterion (see FIG. 6) to the reception unit 13 (Step S1). When, for example, an application that sets the criterion receives an input indicating the setting of the criterion, the client apparatus 3 transmits the device ID and the criterion to the reception unit 13.

Figure 11:
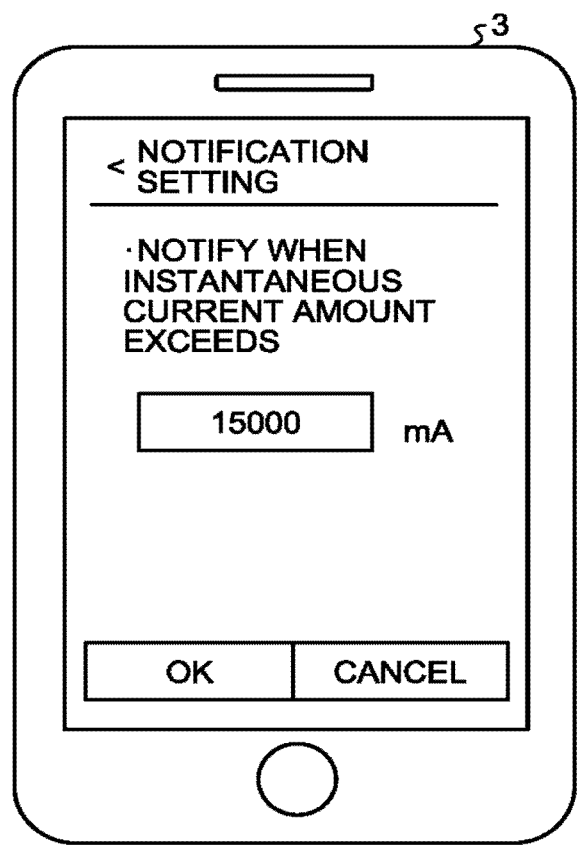
FIG. 11 is a diagram illustrating an exemplary criterion setting screen in the first embodiment.

FIG. 11 is a diagram illustrating an exemplary criterion setting screen in the first embodiment. The example of FIG. 11 illustrates an exemplary case in which the criterion for determining whether the instantaneous current amount exceeds 15000 mA is to be set. The client apparatus 3 transmits the criterion to the reception unit 13 at timing at which, for example, the OK button is tapped.

Reference is made back to FIG. 10. The reception unit 13 inputs the device ID and the criterion received from the client apparatus 3 to the representative criterion selection unit 14 (Step S2).

The representative criterion selection unit 14, having received the device ID and the criterion from the reception unit 13, uses the device ID to search the group information storage unit 111 and identifies a group ID of a group that includes the client apparatus 2 identified by the device ID (Step S3).

The representative criterion selection unit 14 acquires, from the representative criterion storage unit 114, the representative criterion associated with the group identified in the process at Step S3 (Step S4). The representative criterion selection unit 14 receives, from the representative criterion storage unit 114, a response indicating that the process at Step S4 has been successful (Step S5).

The representative criterion selection unit 14 selects a criterion that is more likely to satisfy as a new representative criterion from the criterion transmitted from the client apparatus 3 in the process at Step S1 and the representative criterion acquired in the process at Step S4 (Step S6).

If the representative criterion storage unit 114 requires updating (if the criterion transmitted from the client apparatus 3 in the process at Step S1 is selected), the representative criterion selection unit 14 updates the representative criterion associated with the group ID identified in the process at Step S3 with the new representative criterion selected in the process at Step S6 (Step S7). The representative criterion selection unit 14 receives, from the representative criterion storage unit 114, a response indicating that the process at Step S7 has been successful (Step S8).

If the representative criterion cannot be acquired in the process at Step S4 (e.g., the representative criterion is yet to be stored), the representative criterion selection unit 14 newly adds, to the representative criterion storage unit 114, the criterion transmitted from the client apparatus 3 in the process at Step S1 as the representative criterion for the group identified in the process at Step S3.

The reception unit 13 receives, from the representative criterion selection unit 14, a response indicating that the processes at Step S2 to Step S8 have been successful (Step S9).

The reception unit 13 stores the device ID and the criterion transmitted from the client apparatus 3 in the process at Step S1 in the criterion storage unit 113 (Step S10). The reception unit 13 then receives, from the criterion storage unit 113, a response indicating that the process at Step S10 has been successful (Step S11).

The client apparatus 3 receives, from the reception unit 13, a response indicating that the processes at Step S1 to Step S11 have been successful (Step 12).

Method for Determining Acquired Data

Figure 12:
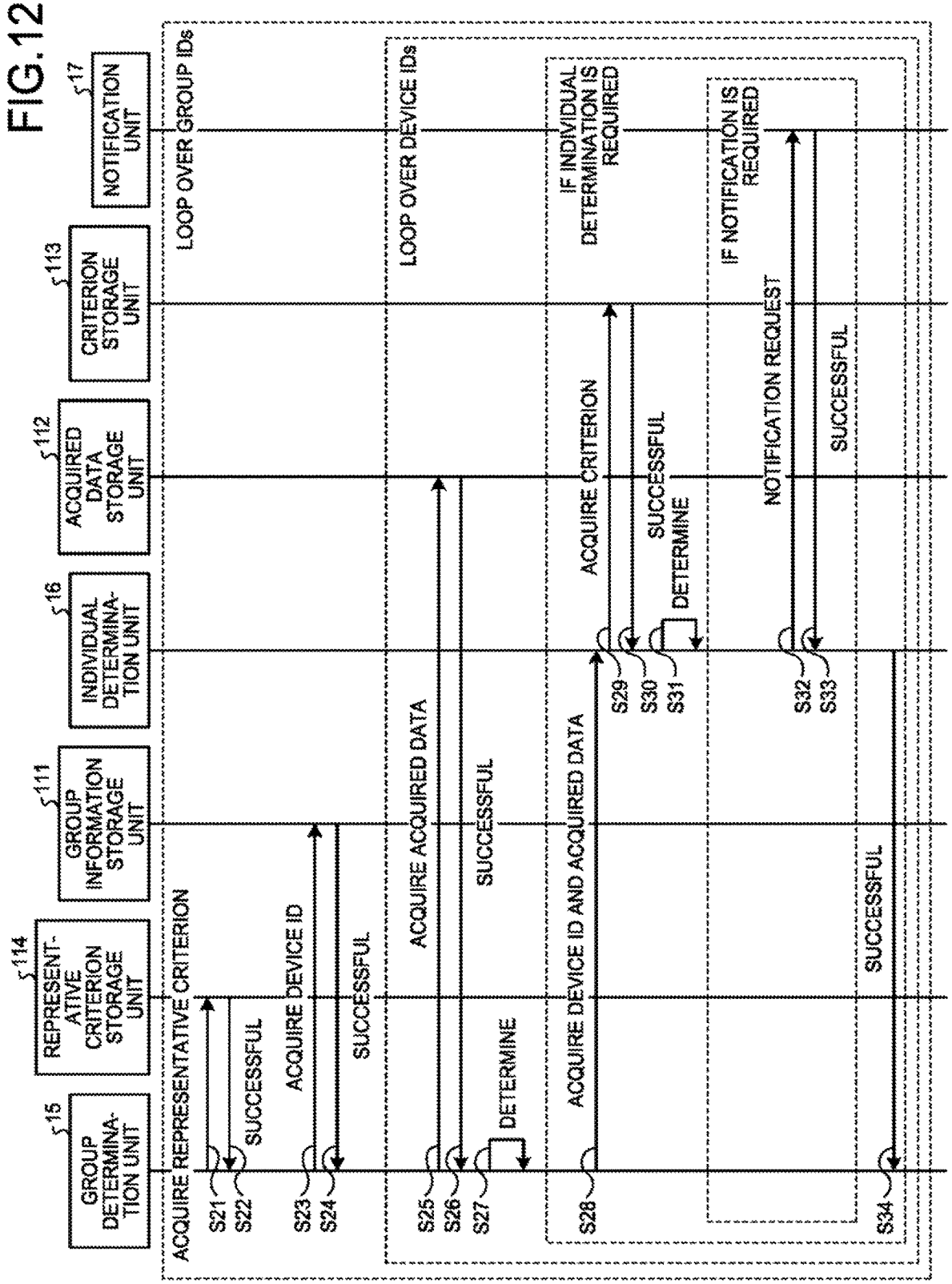
FIG. 12 is a sequence diagram illustrating an exemplary determination method in the first embodiment.

FIG. 12 is a sequence diagram illustrating an exemplary determination method in the first embodiment. The group determination unit 15 first acquires, from the representative criterion storage unit 114, the representative criterion associated with the group ID to be processed (Step S21). The group determination unit 15 next receives, from the representative criterion storage unit 114, a response indicating that the process at Step S21 has been successful (Step 322).

The group determination unit 15 acquires, from the group information storage unit 111, the device ID(s) that identifies the client apparatus 2 included in the group that is identified by the group ID to be processed (Step S23). The group determination unit 15 receives, from the group information storage unit 111, a response indicating that the process at Step S23 has been successful (Step S24).

The group determination unit 15 acquires, from the acquired data storage unit 112, the acquired data associated with the device ID to be processed, as selected from among one or more device IDs acquired in the process at Step S23 (Step S25). It is noted that, for convenience sake, the description with reference to FIG. 12 assumes that one piece of acquired data is acquired in the process at Step S25. The group determination unit 15 receives, from the acquired data storage unit 112, a response indicating that the process at Step S25 has been successful (Step S26).

The group determination unit 15 determines whether the acquired data acquired in the process at Step S25 satisfies the representative criterion acquired in the process at Step S21 (Step S27). With a representative criterion for determining whether 15000 (mA) is exceeded, for example, acquired data indicating 17000 (mA) satisfies the representative criterion.

If an individual determination is required (if the representative criterion is satisfied), the group determination unit 15 inputs the device ID to be processed and the acquired data acquired in the process at Step S25 to the individual determination unit 16, to thereby request the individual determination unit 16 to perform an individual determination process (Step S28). It is noted that the acquired data acquired in the process at Step S25 may be acquired by the individual determination unit 16 from the acquired data storage unit 112.

The individual determination unit 16 uses the device ID input in the process at Step S28 to search the criterion storage unit 113, thereby acquiring the criterion (Step S29). The individual determination unit 16 receives, from the criterion storage unit 113, a response indicating that the process at Step S25 has been successful (Step S30).

The individual determination unit 16 determines whether the acquired data input in the process at Step S28 satisfies the criterion acquired in the process at Step S29 (Step S31). With a criterion for determining whether 16000 (mA) is exceeded, for example, acquired data indicating 17000 satisfies the criterion.

If a notification is required (if the criterion is satisfied), the individual determination unit 16 inputs a notification request to request performance of the notification process mentioned previously to the notification unit 17 (Step S32). The individual determination unit 16 receives, from the notification unit 17, a response indicating that the notification process has been successful (Step S33).

The group determination unit 15 receives, from the individual determination unit 16, a response indicating that the processes at Step S28 to Step S33 have been successful (Step S34).

The processes at Step S21 to Step S34 are performed for each group ID. The processes at Step S25 to Step S34 are performed for each device ID acquired in the process at Step S23.

As described above, in the information processing system 100 according to the first embodiment, the reception unit 12 receives, from at least one client apparatus 2, the reception data (first reception data) in which identification information (device ID in the description for the first embodiment) for identifying the client apparatus 2 and the acquired data that is acquired by the client apparatus 2 are associated with each other. The reception unit 13 receives, from the client apparatus 3, the reception data (second reception data) in which a criterion for determining the acquired data and identification information that identifies the client apparatus 2 are associated with each other. The classification unit 11 classifies the at least one client apparatus 2 into at least one group. The representative criterion selection unit 14 selects, for each group and as the representative criterion (second criterion), a criterion that is most likely to satisfy from among the criteria (first criteria) that are associated with the pieces of identification information of the client apparatuses 2 included in the group. The group determination unit 15 determines whether the acquired data satisfies the representative criterion for the group that includes the client apparatus 2 that has transmitted the acquired data. The individual determination unit 16 determines whether the acquired data satisfying the representative criterion satisfies the criterion associated with the identification information of the client apparatus 2 that has transmitted the acquired data satisfying the representative criterion.

Thus, the information processing system 100 in the first embodiment can prevent quality of services provided thereby from being degraded due to, for example, delayed processing that may occur with an increasing number of devices (client apparatuses 2 and 3) that use the services.

For example, the known determination method requires that a criterion threshold and acquired data are both acquired from a database for each of the client apparatuses 2. The information processing system 100 in the first embodiment described above, however, enables acquisition of the criterion for the client apparatuses 2 within the same group in one access. This capability can reduce a frequency of accessing the database as compared with the known art.

Consider a case that involves a large number of client apparatuses 2 and a large number of registrations of criteria and in which the criteria and acquired data are read for comparison from the database at regular intervals, such as every minute. The information processing system 100 in the first embodiment can reduce seek time and processing load such as input and output processing, compared with the known determination method.

Additionally, unlike the known determination method, reduction in the frequency of determination processing is not required in order to reduce the number of accesses to the database that require processing load. This arrangement can shorten time required for the notification process to be performed after the acquired data satisfying the criterion has been acquired, so that the information processing system 100 in the first embodiment can respond to a situation in which real-timeness is required.

The known determination method caches acquired data, criteria, and other data in memory in order to reduce the number of accesses to the database that require processing load. A cache miss can thus occur with data that could not be stored in memory. The known determination method can thus involve a large number of accesses to the database. In contrast, the information processing system 100 in the first embodiment can prevent quality of services provided thereby from being degraded due to, for example, delayed processing, even when a large volume of data of acquired data and criteria is involved, as against the known determination method.

Additionally, the information processing system 100 in the first embodiment can maintain quality of services even without the need to incorporate the server apparatus 1 that includes high performance hardware and a plurality of instances as in the known determination method. Specifically, the information processing system 100 in the first embodiment can reduce operating cost of the information processing system 100.

Second Embodiment

The following describes a second embodiment. The information processing system 100 in the second embodiment will be described for a case in which, for each group, acquired data with which a criterion is most likely to satisfy is selected as representative acquired data (second acquired data) from among pieces of acquired data (first acquired data) that are associated with pieces of identification information (device IDs) of client apparatuses 2 included in the group. It is noted that only differences from the first embodiment described above will be described and descriptions of similarities will be omitted in the details of the second embodiment.

Functional Configuration of Server Apparatus

Figure 13:
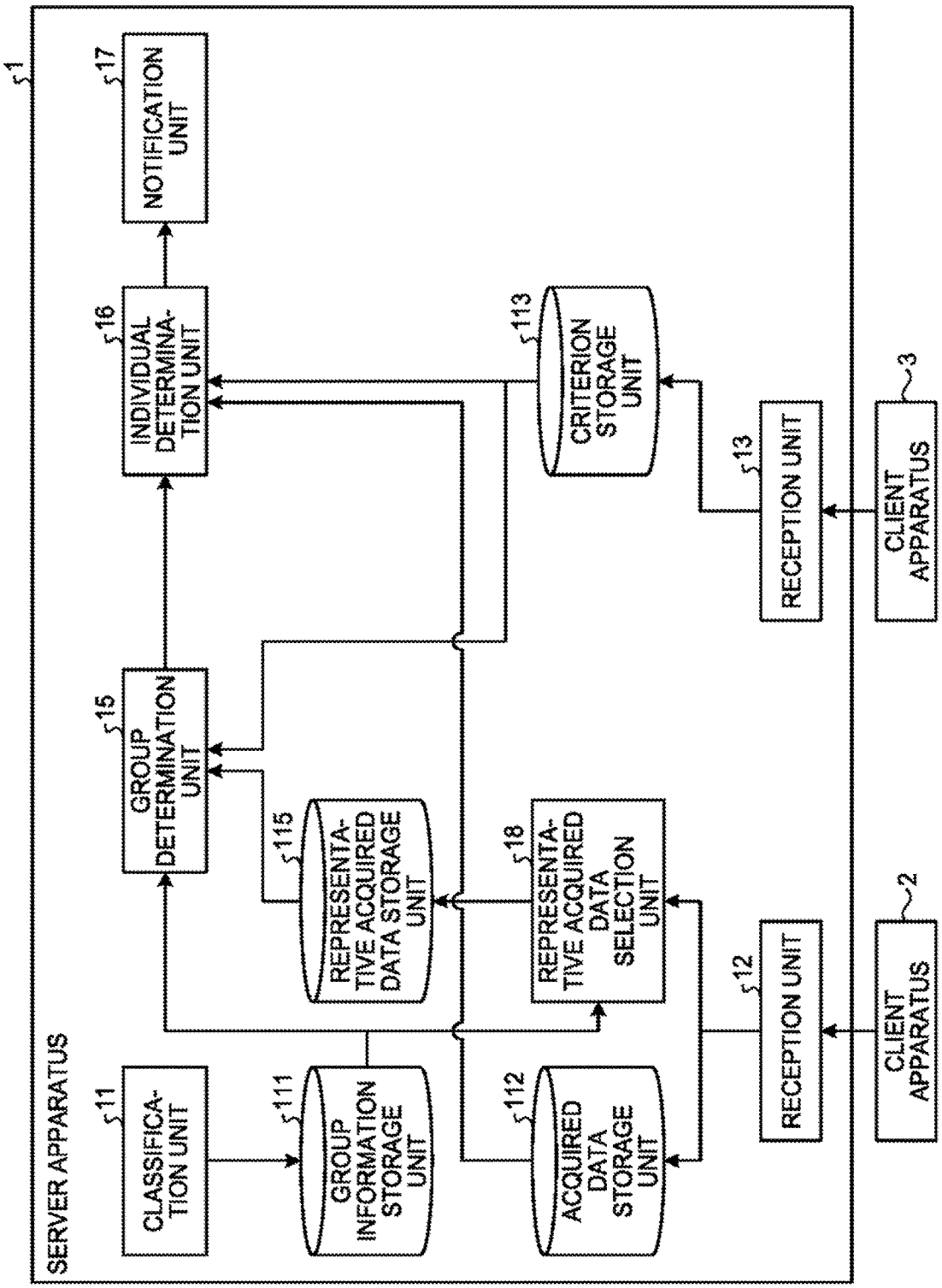
FIG. 13 is a diagram illustrating an exemplary functional configuration of a server apparatus in a second embodiment.

FIG. 13 is a diagram illustrating an exemplary functional configuration of the server apparatus 1 in the second embodiment. The server apparatus 1 in the second embodiment includes the classification unit 11, the reception unit 12, the reception unit 13, the group determination unit 15, the individual determination unit 16, the notification unit 17, a representative acquired data selection unit the group information storage unit 111, the acquired data storage unit 112, the criterion storage unit 113, and representative acquired data storage unit 115.

Descriptions for the classification unit 11 and the group information storage unit 111 in the second embodiment, which are identical to the descriptions for the classification unit 11 and the group information storage unit 111 in the first embodiment, will be omitted.

Reception of Acquired Data

The reception unit 12, having received from at least one client apparatus 2 reception data (first reception data) including acquired data acquired by the client apparatus 2, stores the acquired data in the acquired data storage unit 112. Descriptions for the acquired data storage unit 112 in the second embodiment, which are identical to the descriptions for the acquired data storage unit 112 in the first embodiment, will be omitted.

Selection of Representative Acquired Data

The reception unit 12 inputs, to the representative acquired data selection unit 18, the device ID (the value of id) included in the reception data and the acquired data included in the reception data.

The representative acquired data selection unit 18 selects, for each group and as representative acquired data (second acquired data), acquired data with which a criterion is most likely to satisfy from among pieces of acquired data (first acquired data) that are associated with the pieces of identification information (device IDs) of the client apparatuses 2 included in the group. When the criterion is a threshold (mA) of the instantaneous current amount, for example, a maximum value of the pieces of acquired data in the same group is the acquired data by which the criterion is most likely to satisfy. The representative acquired data selection unit 18 then stores the representative acquired data in the representative acquired data storage unit 115.

FIG. 14 is a diagram illustrating exemplary information stored in the representative acquired data storage unit 115 in the second embodiment. The representative acquired data storage unit 115 in the second embodiment stores therein group IDs and pieces of representative acquired data. The group ID is identification information that identifies a group. The representative acquired data is used when the group determination unit 15 determines pieces of acquired data acquired by client apparatuses included in the same group.

Specifically, the representative acquired data selection unit 18, having received the device ID and the acquired data from the reception unit 12, searches the group information storage unit 111 using the device ID to thereby identify a specific group that includes the client apparatus 2 identified by the device ID. The representative acquired data selection unit 18 next compares the representative acquired data that is stored in the representative acquired data storage unit 115 and is associated with the identified group with the acquired data received from the reception unit 12. The representative acquired data selection unit 18, on finding that the criterion is more likely to satisfy with the acquired data received from the reception unit 12 than with the representative acquired data that is stared in the representative acquired data storage unit 115, updates the representative acquired data in the representative acquired data storage unit 115 with the acquired data received from the reception unit 12.

In the example illustrated in FIG. 14, the representative acquired data for a group ID of 0, for example, is 9000 (mA). In this case, when the reception unit 12 receives reception data that includes the device ID of a client apparatus 2 included in the group with the group ID of 0 and acquired data (10000), the representative acquired data selection unit 18 updates the representative acquired data for the group ID of 0 from 9000 to 10000. This is because of the following reason. Specifically, for a criterion used to determine whether the instantaneous current amount exceeds a threshold, the criterion is more likely to satisfy when the instantaneous current amount is 10000 (mA) than when the instantaneous current amount is 9000 (mA).

The representative acquired data storage unit 115 is implemented by, for example, a volatile storage device such as an in-memory database.

Reception of Criterion

Reference is made back to FIG. 13. The reception unit 13, having received, from at least one client apparatus 3, reception data (second reception data) that includes a criterion for determining the acquired data acquired by the client apparatus 2, stores the criterion in the criterion storage unit 113. Descriptions for the criterion storage unit 113 in the second embodiment, which are identical to the descriptions for the criterion storage unit 113 in the first embodiment, will be omitted.

Determination of Acquired Data

The group determination unit 15 determines, for each group, whether the representative acquired data stored in the representative acquired data storage unit 115 satisfies the criterion for the client apparatuses 2 included in the group.

Specifically, the group determination unit 15 reads a group ID and representative acquired data associated with the group ID from the representative acquired data storage unit 115. The group determination unit 15 next reads, from the group information storage unit 111, a device ID associated with the group ID. The group determination unit 15 then reads from the criterion storage unit 113 a criterion associated with the device ID. The group determination unit 15 then determines whether the representative acquired data read from the representative acquired data storage unit 115 satisfies the criterion read from the criterion storage unit 113.

It is noted that the representative acquired data may be determined at any timing as to whether to satisfy the criterion. For example, the group determination unit 15 may determine at predetermined time intervals of ten minutes whether the representative acquired data satisfies the criterion for each client apparatus 2 included in the group associated with the representative acquired data.

The group determination unit 15, upon determination that the representative acquired data satisfies the criterion, requests the individual determination unit 16 to perform an individual determination process.

The individual determination unit 16, having received the request for performance of the individual determination process from the group determination unit 15, reads, from the acquired data storage unit 112, the acquired data associated with the device ID of the client apparatus 2 for which the representative acquired data satisfies the criterion. The individual determination unit 16 determines whether the acquired data satisfies the criterion.

If the criterion is determined to be satisfied, the individual determination unit 16 requests the notification unit 17 to perform a notification process. Descriptions for the notification unit 17 in the second embodiment, which are identical to the descriptions for the notification unit 17 in the first embodiment, will be omitted.

Information Processing Method

The following describes an exemplary information processing method in the second embodiment.

Method for Storing Acquired Data and Representative Acquired Data

Figure 15:
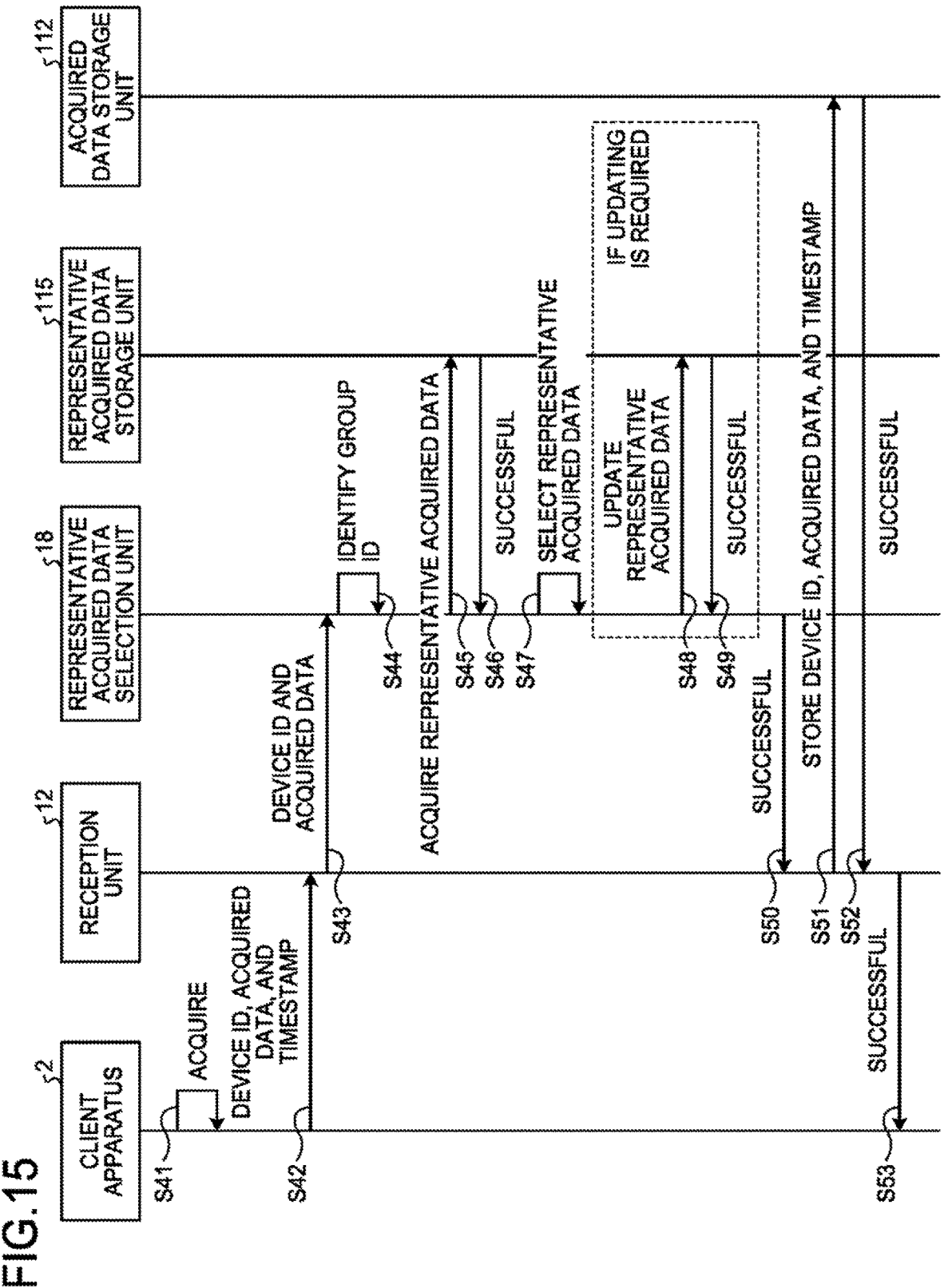
FIG. 15 is a sequence diagram illustrating an exemplary method for storing acquired data and representative acquired data in the second embodiment.

FIG. 15 is a sequence diagram illustrating an exemplary method for storing the acquired data and the representative acquired data in the second embodiment. The client apparatus 2 first acquires acquired data (Step S41). The client apparatus 2 next transmits, to the reception unit 12, a device ID, the acquired data, and a timestamp (see FIG. 4) (Step S42). The client apparatus 2 transmits the device ID, the acquired data, and the timestamp to the reception unit 12 regularly, for example.

The reception unit 12 inputs the device ID and the acquired data received from the client apparatus 2 to the representative acquired data selection unit 18 (Step 343).

The representative acquired data selection unit 18, having received the device ID and the acquired data from the reception unit 12, searches the group information storage unit 111 using the device ID to thereby identify a specific group ID of the group that includes the client apparatus identified by the device ID (Step S44).

The representative acquired data selection unit 18 acquires, from the representative acquired data storage unit 115, the representative acquired data associated with the group ID that has been identified in the process at Step S44 (Step S45). The representative acquired data selection unit 18 receives, from the representative acquired data storage unit 115, a response indicating that the process at Step S45 has been successful (Step S46).

The representative acquired data selection unit 18 selects, as new representative acquired data, the acquired data that has been acquired by the client apparatus 2 in the process at Step S41 or the representative acquired data that has been acquired in the process at Step S45, with which a criterion is more likely to satisfy (Step S47). When, for example, the criterion is the threshold of the instantaneous current amount, a maximum value of the acquired data included in an identical group is the acquired data with which the criterion is most likely to satisfy.

If the representative acquired data storage unit 115 requires updating (if the acquired data acquired by the client apparatus 2 in the process at Step S41 is selected), the representative acquired data selection unit 18 updates the representative acquired data associated with the group ID identified in the process at Step S44 with the new representative acquired data selected in the process at Step S47 (Step S48). The representative acquired data selection unit 18 receives, from the representative acquired data storage unit 115, a response indicating that the process at Step S48 has been successful (Step S49).

If the representative acquired data cannot be acquired in the process at Step S45 (e.g., the representative acquired data is yet to be stored), the representative acquired data selection unit 18 newly adds, to the representative acquired data storage unit 115, the acquired data transmitted from the client apparatus 2 in the process at Step S41 as the representative acquired data associated with the group ID that has been identified in the process at Step S44.

The reception unit 12 receives, from the representative acquired data selection unit 18, a response indicating that the processes at Step S43 to Step S49 have been successful (Step S50).

The reception unit 12 stores the device ID, the acquired data, and the timestamp transmitted from the client apparatus in the process at Step S41 in the acquired data storage unit 112 (Step S51). The reception unit 12 then receives, from the acquired data storage unit 112, a response indicating that the process at Step S51 has been successful (Step S52).

The client apparatus 2 receives, from the reception unit 12, a response indicating that the processes at Step S42 to Step S52 have been successful (Step S53).

Method for Determining Acquired Data

Figure 16:
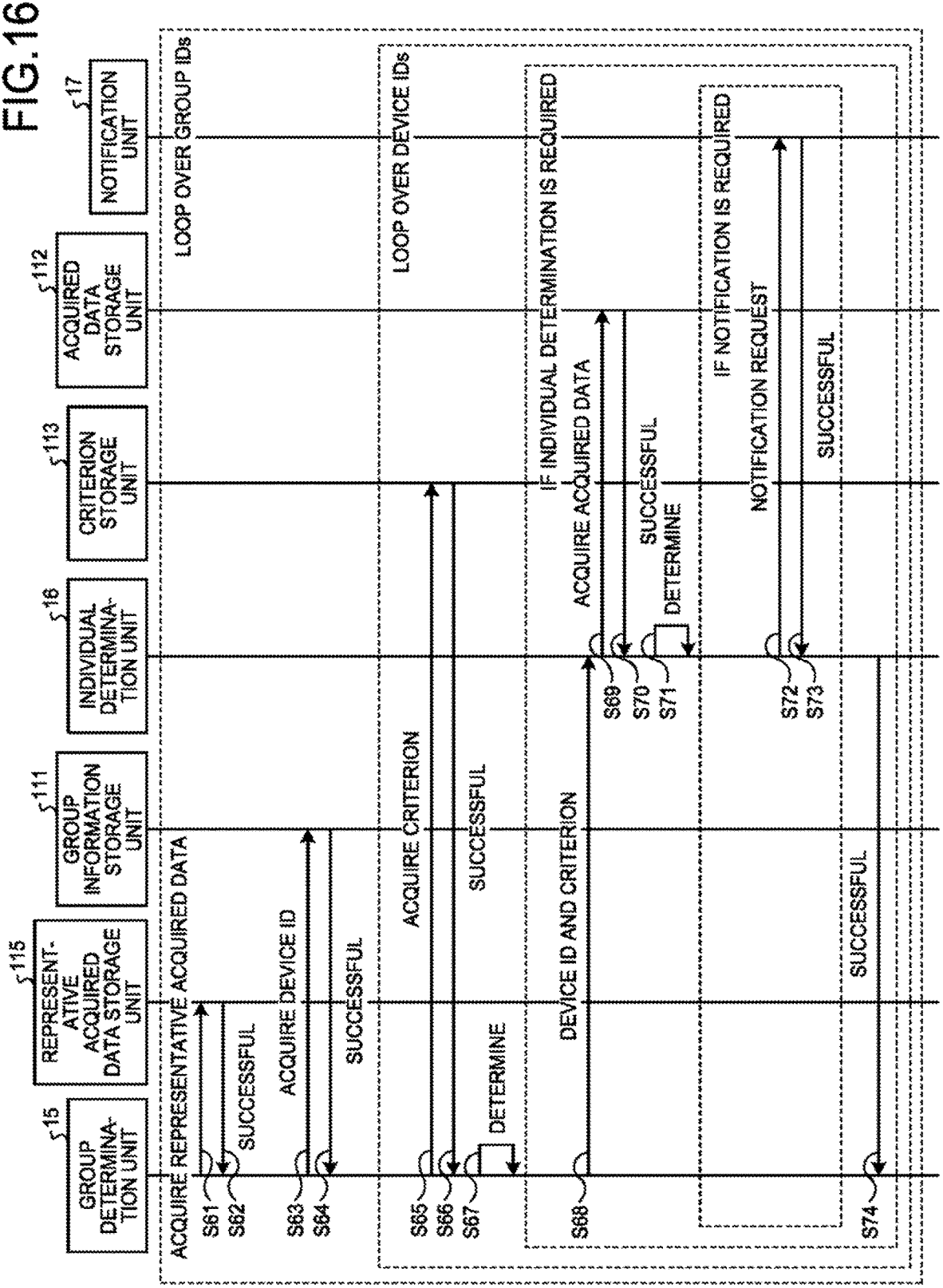
FIG. 16 is a sequence diagram illustrating an exemplary determination method in the second embodiment.

FIG. 16 is a sequence diagram illustrating an exemplary determination method in the second embodiment. The group determination unit 15 first acquires, from the representative acquired data storage unit 115, representative acquired data associated with a group ID to be processed (Step S61). The group determination unit 15 next receives, from the representative acquired data storage unit 115, a response indicating that the process at Step S61 has been successful (Step S62).

The group determination unit 15 acquires, from the group information storage unit 111, a device ID that identifies the client apparatus 2 included in the group that is identified by the group ID to be processed (Step 363). The group determination unit 15 receives, from the group information storage unit 111, a response indicating that the process at Step S63 has been successful (Step S64).

The group determination unit 15 acquires, from the criterion storage unit 113, a criterion associated with the device ID to be processed, as selected from among one or more device IDs acquired in the process at Step S63 (Step S65). The group determination unit 15 receives, from the criterion storage unit 113, a response indicating that the process at Step S65 has been successful (Step S66).

The group determination unit 15 determines whether the representative acquired data acquired in the process at Step S61 satisfies the criterion acquired in the process at Step S65 (Step S67). With a criterion for determining whether 15000 (mA) is exceeded, for example, representative acquired data indicating 17000 (mA) satisfies the criterion.

If an individual determination is required (if the criterion is satisfied), the group determination unit 15 inputs the device ID to be processed and the criterion acquired in the process at Step S65 to the individual determination unit 16, to thereby request the individual determination unit 16 to perform an individual determination process (Step S68). It is noted that the criterion acquired in the process at Step S65 may be acquired by the individual determination unit 16 from the criterion storage unit 113.

The individual determination unit 16 uses the device ID input in the process at Step S68 to search the acquired data storage unit 112, thereby acquiring the acquired data (Step S69). The individual determination unit 16 receives, from the acquired data storage unit 112, a response indicating that the process at Step S69 has been successful (Step S70).

The individual determination unit 16 determines whether the acquired data acquired in the process at Step S69 satisfies the criterion input in the process at Step 368 (Step S71). With a criterion for determining whether 16000 (mA) is exceeded, for example, acquired data indicating 17000 (mA) satisfies the criterion.

If a notification is required (if the criterion is satisfied), the individual determination unit 16 inputs a notification request to request performance of the notification process mentioned previously to the notification unit 17 (Step S72). The individual determination unit 16 receives, from the notification unit 17, a response indicating that the notification process has been successful (Step S73).

The group determination unit 15 receives, from the individual determination unit 16, a response indicating that the processes at Step S68 to Step S73 have been successful (Step S74).

It is noted that the processes at Step S61 to Step S74 are performed for each group ID. The processes at Step S65 to Step S74 are performed for each device ID acquired in the process at Step S63.

As described above, in the information processing system 100 in the second embodiment, the representative acquired data selection unit 18 selects, for each group and as the representative acquired data (second acquired data), acquired data with which the criterion is most likely to satisfy from among the pieces of acquired data (first acquired data) that are associated with the pieces of identification information (device IDs in the description for the second embodiment) of the client apparatuses 2 included in the group. The group determination unit 15 determines, for each group, whether the representative acquired data satisfies the criterion. If the representative acquired data satisfies the criterion, the individual determination unit 16 determines whether the acquired data associated with the identification information of the client apparatus 2 for which the representative acquired data satisfies the criterion satisfies the criterion.

Thus, the information processing system 100 in the second embodiment can achieve effects identical to the effects achieved by the information processing system 100 in the first embodiment. Specifically, the information processing system 100 in the second embodiment can prevent quality of services provided thereby from being degraded due to, for example, delayed processing that may occur with an increasing number of devices (client apparatuses 2 and 3) that use the services.

For example, the known determination method requires that a criterion threshold and acquired data are both acquired from a database for each of the client apparatuses 2. The information processing system 100 in the second embodiment described above, however, enables acquisition of the acquired data for the client apparatuses 2 within an identical group in one access. This capability can reduce a frequency of accessing the database as compared with the known art.

Third Embodiment

The following describes a third embodiment. An information processing system 100 in the third embodiment will be described for a case in which the first embodiment is combined with the second embodiment. It is noted that only differences from the first and the second embodiments described above will be described and descriptions of similarities will be omitted in the details of the third embodiment.

Functional Configuration of Server Apparatus

Figure 17:
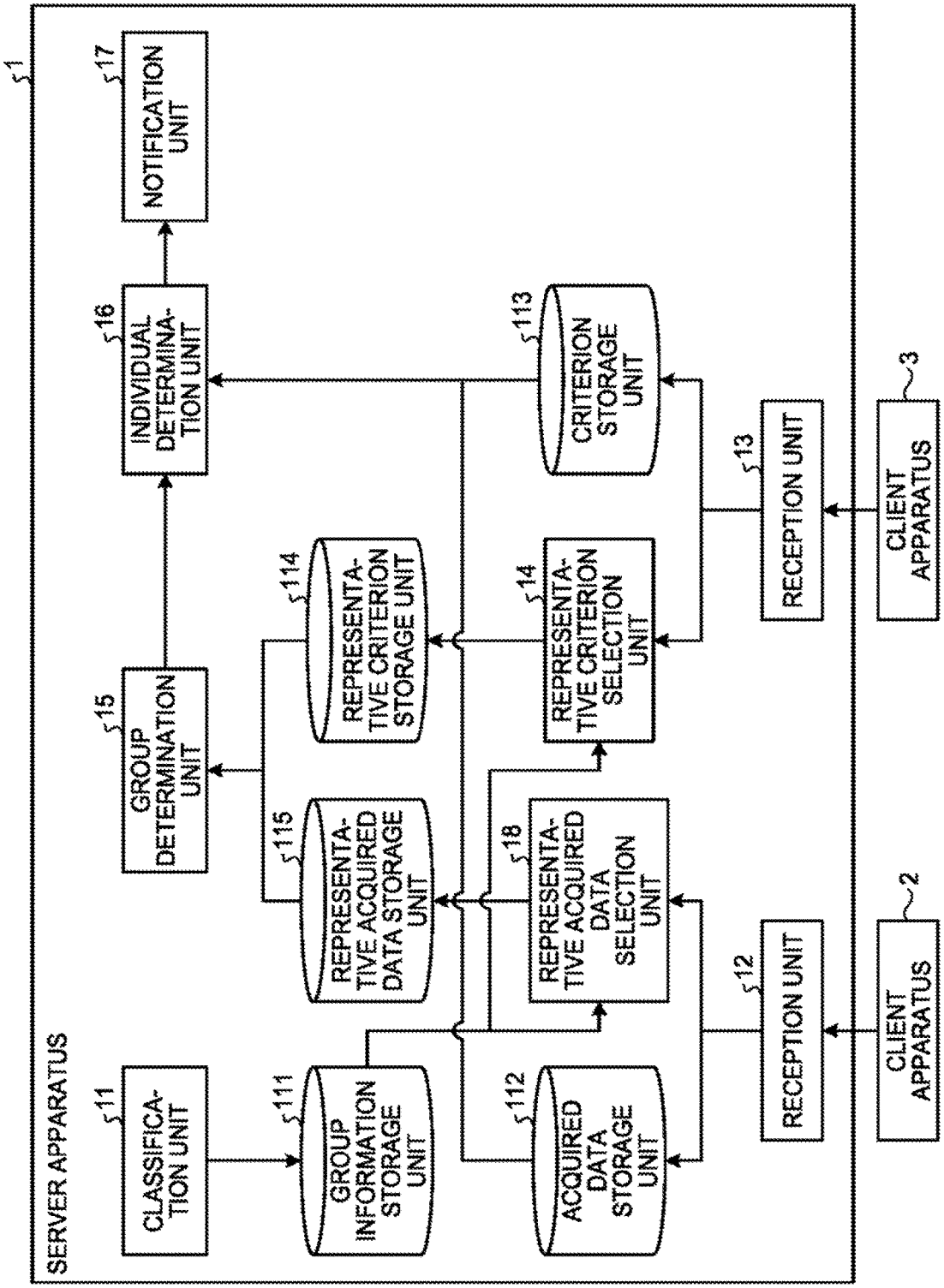
FIG. 17 is a diagram illustrating an exemplary functional configuration of a server apparatus in a third embodiment.

FIG. 17 is a diagram illustrating an exemplary functional configuration of the server apparatus 1 in the third embodiment. The server apparatus 1 in the third embodiment includes the classification unit 11, the reception unit 12, the reception unit 13, the representative criterion selection unit 14, the group determination unit 15, the individual determination unit 16, the notification unit 17, the representative acquired data selection unit 18, the group information storage unit 111, the acquired data storage unit 112, the criterion storage unit 113, the representative criterion storage unit 114, and the representative acquired data storage unit 115.

Descriptions for the classification unit 11 and the group information storage unit 111 in the third embodiment, which are identical to the descriptions for the classification unit 11 and the group information storage unit 111 in the first embodiment, will be omitted.

Reception of Acquired Data

The reception unit 12, having received, from at least one client apparatus 2, reception data (first reception data) including acquired data acquired by the client apparatus 2, stores the acquired data in the acquired data storage unit 112. Descriptions for the acquired data storage unit 112 in the third embodiment, which are identical to the descriptions for the acquired data storage unit 112 in the first embodiment, will be omitted.

Selection of Representative Acquired Data

The reception unit 12 inputs, to the representative acquired data selection unit 18, the device ID (the value of id) included in the reception data and the acquired data included in the reception data.

The representative acquired data selection unit 18 selects, for each group and as representative acquired data (second acquired data), acquired data with which a criterion is most likely to satisfy from among pieces of acquired data (first acquired data) that are associated with the pieces of identification information (device IDs) of the client apparatuses 2 included in the group. The representative acquired data selection unit 18 then stores the representative acquired data in the representative acquired data storage unit 115. Descriptions for the representative acquired data storage unit 115 in the third embodiment, which are identical to the descriptions for the representative acquired data storage unit 115 in the second embodiment, will be omitted.

Reception of Criterion

The reception unit 13, having received, from at least one client apparatus 3, reception data (second reception data) that includes a criterion for determining the acquired data acquired by the client apparatus 2, stores the criterion in the criterion storage unit 113. Descriptions for the criterion storage unit 113 in the third embodiment, which are identical to the descriptions for the criterion storage unit 113 in the first embodiment, will be omitted.

Selection of Representative Criterion

The reception unit 13 inputs, to the representative criterion selection unit 14, the device IP (the value of id) included in the reception data and the criterion (the value of threshold) included in the reception data.

The representative criterion selection unit 14 selects, for each group and as a representative criterion (a second criterion), a criterion that is most likely to satisfy from among criteria (first criteria) that are associated with the pieces of identification information (device IDs) of the client apparatuses 3 included in the group. The representative criterion selection unit 14 then stores the representative criterion in the representative criterion storage unit 114. Descriptions for the representative criterion storage unit 114 in the third embodiment, which are identical to the descriptions for the representative criterion storage unit 114 in the first embodiment, will be omitted.

Determination of Acquired Data

The group determination unit 15 determines, for each group, whether the representative acquired data (second acquired data) stored in the representative acquired data storage unit 115 satisfies the representative criterion (second criterion) stored in the representative criterion storage unit 114.

Specifically, the group determination unit 15 reads a group ID and representative acquired data associated with the group ID from the representative acquired data storage unit 115. The group determination unit 15 next reads, from the representative criterion storage unit 114, a representative criterion associated with the group ID. The group determination unit 15 then determines whether the representative acquired data satisfies the representative criterion.

It is noted that the representative acquired data may be determined at any timing as to whether to satisfy the representative criterion. For example, the group determination unit to may determine at predetermined time intervals of one minute whether the representative acquired data of each group satisfies the representative criterion of each group.

The group determination unit 15, upon determination that the representative acquired data satisfies the criterion, requests the individual determination unit 16 to perform an individual determination process.

The individual determination unit 16, having received the request for performance of the individual determination process from the group determination unit 15, acquires, from the acquired data storage unit 112, the acquired data for the client apparatuses 2 that are included in the group identified by the group ID associated with the representative acquired data (representative criterion). The individual determination unit 16 determines whether the acquired data satisfies the criterion for each of the client apparatuses included in the group.

If the criterion is determined to be satisfied, the individual determination unit 16 requests the notification unit 17 to perform a notification process. Descriptions for the notification unit 17 in the third embodiment, which are identical to the descriptions for the notification unit 17 in the first embodiment, will be omitted.

Information Processing Method

The following describes an exemplary information processing method in the third embodiment.

Determination Method

Figure 18:
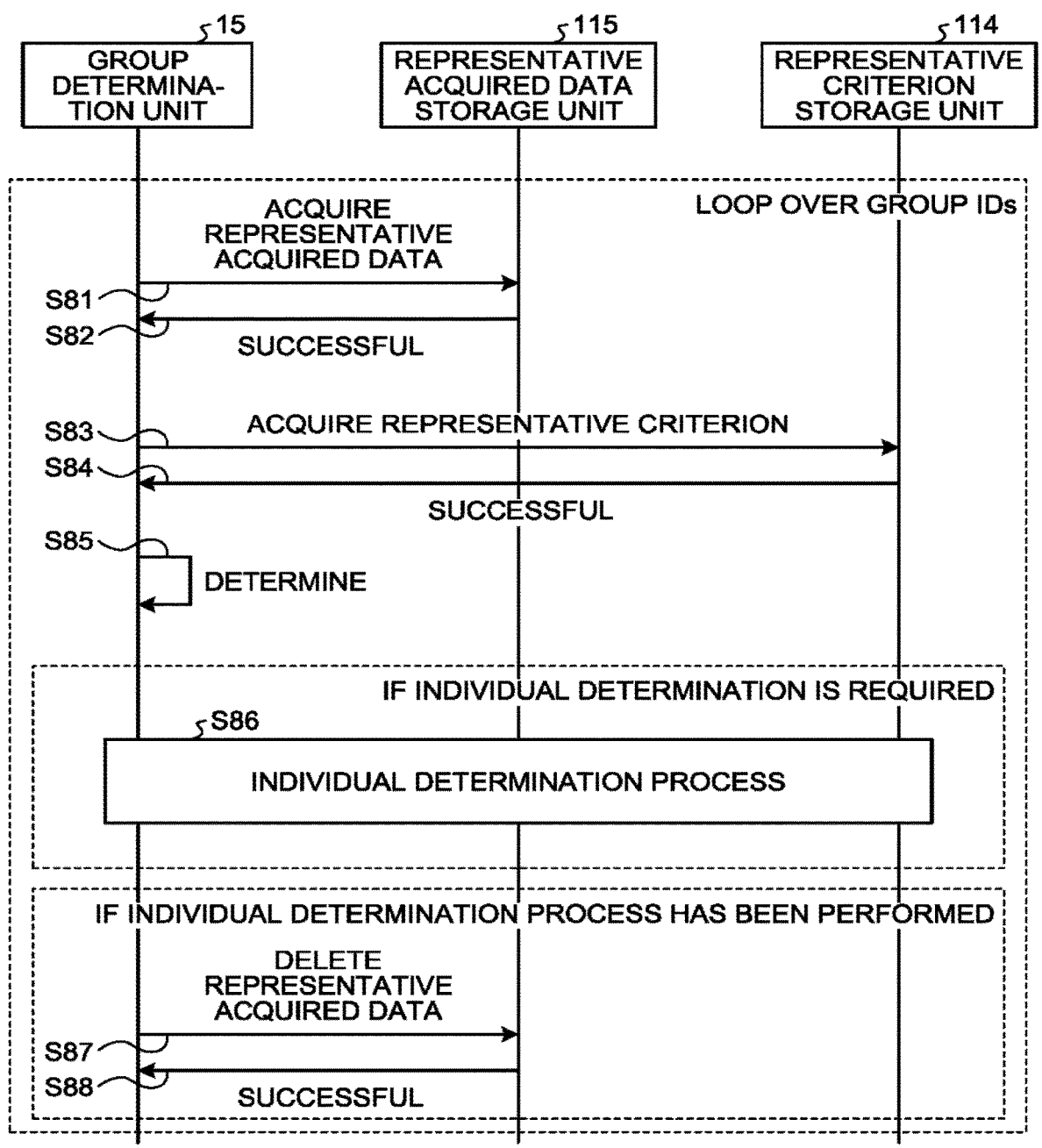
FIG. 18 is a sequence diagram illustrating an exemplary determination method in the third embodiment.

FIG. 18 is a sequence diagram illustrating an exemplary determination method in the third embodiment. The group determination unit 15 first acquires, from the representative acquired data storage unit 115, representative acquired data of a group to be processed (Step S81). The group determination unit 15 next receives, from the representative acquired data storage unit 115, a response indicating that the process at Step S81 has been successful (Step S82).

When, for example, the representative acquired data storage unit 115 is in the condition as illustrated in FIG. 14 and a group ID of the group to be processed is 0, the representative acquired data that is to be acquired is 9000. The value (9000) is, specifically, a maximum value of pieces of acquired data transmitted so far to the server apparatus 1 from the client apparatuses 2 that belong to the group identified by the group ID of 0. It is noted that, when the process at Step S87 to be later described has been performed, the value is a maximum value of the pieces of acquired data transmitted after Step S87 to the server apparatus 1 from the client apparatuses 2 that belong to the group identified by the group ID of 0.

The group determination unit 15 acquires the representative criterion from the representative criterion storage unit 114 (Step S83). The group determination unit 15 next receives, from the representative criterion storage unit 114, a response indicating that the process at Step S83 has been successful (Step S84).

When, for example, the representative criterion storage unit 114 is in the condition as illustrated in FIG. 8 and the croup ID of the group to be processed is 0, the representative criterion that is to be acquired is 16000. The value (16000) is, specifically, the threshold of the criterion that is most likely to satisfy out of the criteria for the client apparatuses 2 that belong to the group identified by the group ID of 0.

The group determination unit 15 determines whether the representative acquired data (second acquired data) satisfies the representative criterion (second criterion) (Step S85).

If an individual determination is required (if the representative acquired data satisfies the representative criterion), the individual determination unit 16 performs the individual determination process (Step S86). The individual determination process will be detailed later with reference to FIG. 19.

If the individual determination process of Step S86 has been performed, the group determination unit 15 deletes the representative acquired data (Step S87). The group determination unit is next receives, from the representative acquired data storage unit 115, a response indicating that the process at Step S87 has been successful (Step S88).

The process at Step S87 allows the representative acquired data stored in the representative acquired data storage unit 115 to be updated on the basis of the acquired data to be thereafter received from the client apparatus 2. The process at Step S87 may nonetheless be omitted. If the process at Step S87 is not performed, the representative acquired data is updated using the acquired data received so far from the client apparatus 2.

The processes at Step S81 to Step S88 are performed for each group ID. When, for example, the representative acquired data storage unit 115 is in the condition as illustrated in FIG. 14 and the representative criterion storage unit 114 is in the condition as illustrated in FIG. 8, because the relation of 9000<16000 holds in the process at Step S85 for group ID=0, the individual determination process of Step S86 is not performed. For next group ID=1, because the relation of 4000<12000 holds in the process at Step S85, the individual determination process of Step S86 is thus not performed. For next group ID=2, because the relation of 13000<12000 holds in the process at Step 385, the individual determination process of Step S86 is thus performed.

Individual Determination Process

The following details the individual determination process in the process at Step S86.

Figure 19:
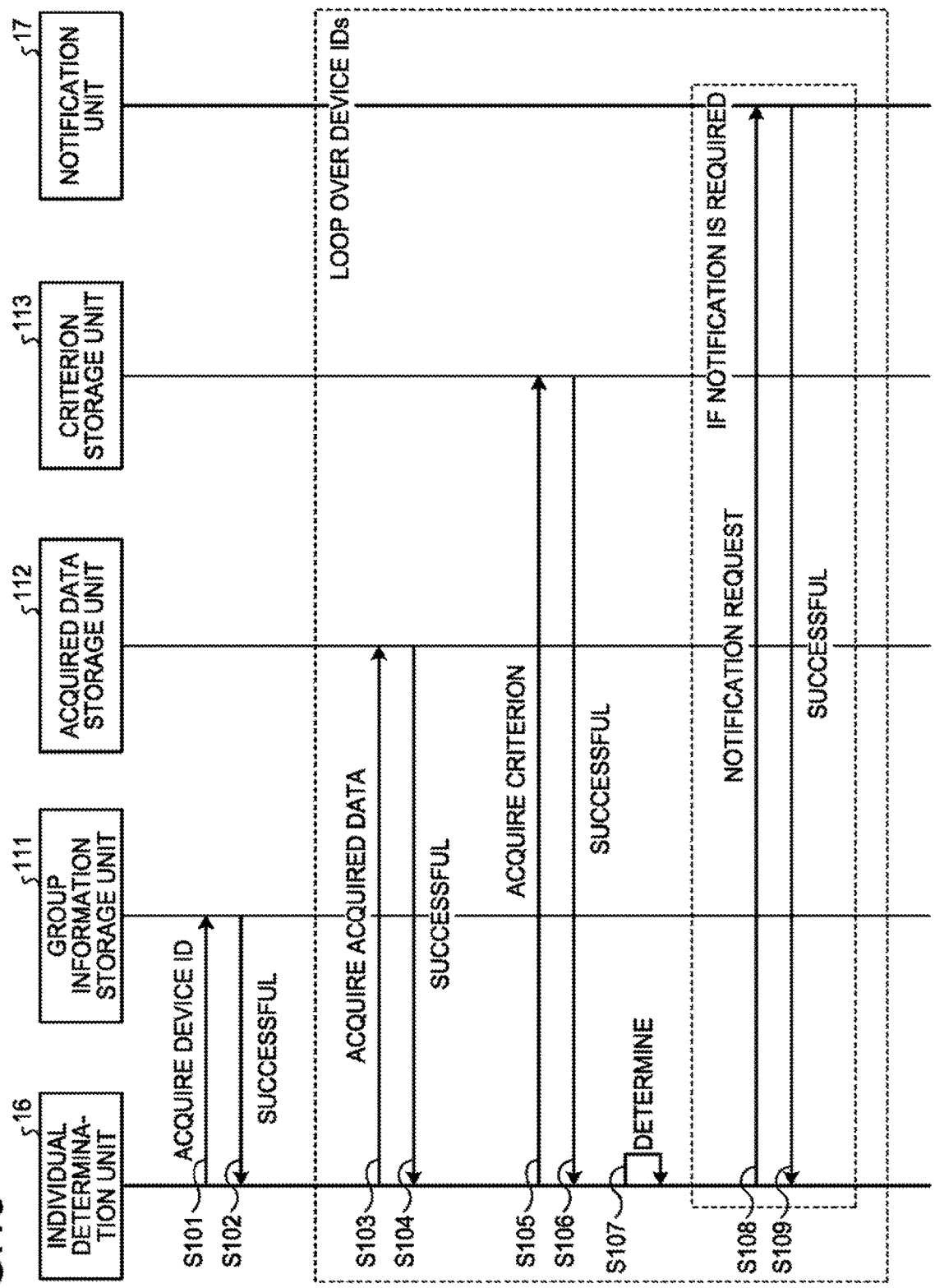
FIG. 19 is a sequence diagram illustrating an exemplary individual determination process in the third embodiment.

FIG. 19 is a sequence diagram illustrating an exemplary individual determination process in the third embodiment. The individual determination unit 16 first acquires, from the group information storage unit 111, at least one device ID that identifies the client apparatus 2 included in the group that is identified by the group ID to be processed (Step S101). The individual determination unit 16 next receives, from the group information storage unit 111, a response indicating that the process at Step S101 has been successful (Step S102).

The individual determination unit 16 acquires, from the acquired data storage unit 112, acquired data associated with a device ID to be processed frog among the at least device ID acquired in the process at Step S101 (Step S103). If plurality of pieces of acquired data associated with the device ID to be processed are available, the acquired data having an immediate timestamp is acquired. The individual determination unit 16 then receives, from the acquired data storage unit 112, a response indicating that the process at Step S103 has been successful (Step S104).

The individual determination unit 16 acquires, from the criterion storage unit 113, a criterion associated with the device ID to be processed from among the at least device ID acquired in the process at Step S101 (Step S105). The individual determination unit 16 then receives, from the criterion storage unit 113, a response indicating that the process at Step S105 has been successful (Step S106).

The individual determination unit 16 determines whether the acquired data acquired in the process at Step S103 satisfies the criterion acquired in the process at Step S105 (Step S107).

If a notification is required (if the criterion is satisfied), the individual determination unit 16 inputs a notification request to request performance of the notification process mentioned previously to the notification unit 17 (Step S108). The individual determination unit 16 receives, from the notification unit 17, a response indicating that the notification process has been successful Step S109).

The processes at Step S103 to Step S109 are performed for each device ID.

As described above, in the information processing system 100 in the third embodiment, the representative acquired data selection unit 18 selects, for each group and as the representative acquired data (second acquired data), acquired data with which the criterion (representative criterion) is most likely to satisfy from among the pieces of acquired data (first acquired data) that are associated with the pieces of identification information (device IDs in the description for the third embodiment) of the client apparatuses 2 included in the group. The representative criterion selection unit 14 selects, for each group and as the representative criterion (second criterion), the criterion that is most likely to satisfy from among the criteria (first criteria) that are associated with the pieces of identification information of the client apparatuses 2 included in the group. The group determination unit 15 determines, for each group, whether the representative acquired data satisfies the representative criterion. If the representative acquired data satisfies the representative criterion, the individual determination unit 16 performs the individual determination process described above.

Greater effects can be expected from the information processing system 100 in the third embodiment than from each of the information processing system 100 in the first embodiment and the information processing system 100 in the second embodiment.

Specifically, in the information processing system 100 in the third embodiment, the representative acquired data is compared with the threshold of the representative criterion and, if the representative acquired data is smaller than the threshold of the representative criterion, the individual determination process is omitted for each of the client apparatuses 2 that belong to the group identified by the group ID concerned. This approach is taken for the following reason. Specifically, when a maximum value of the acquired data acquired by the client apparatuses 2 that belong to the group ID is found to be smaller than a minimum value of the threshold of the criterion, the acquired data acquired by all client apparatuses 2 that belong to the group ID is guaranteed to be smaller than the threshold of the criterion for each of the client apparatuses 2.

A frequency of access to the database and of a comparison process involved in the individual determination process can thus be reduced, so that quality of services can be prevented from being degraded. This effect is particularly conspicuous when a frequency at which the acquired data acquired by a client apparatus 2 satisfies the criterion for the acquired data acquired by the client apparatus 2 is low.

Additionally, in the third embodiment, an even more conspicuous effect can be obtained from a configuration of the acquired data storage unit 112 and the criterion storage unit 113 implemented by low-speed databases such as relational databases and the representative acquired data storage unit 115 and the representative criterion storage unit 114 implemented by high-speed databases such as in-cache memories. Configuring a high-speed database to offer large capacity generally requires high cost. The server apparatus 1 can, however, be configured at low cost by a design in which only the representative acquired data and the representative criteria are stored in high-speed databases, as compared with a design in which all acquired data and criteria are stored in high-speed databases.

Additionally, when the server apparatus 1 is implemented by a virtual server (instance) on a cloud computing environment, the server apparatus 1 can be configured at even lower cost by changing the number of instances by a time period. A possible operation along this approach may operate the server apparatus 1 with a smaller number of instances during a time period that is known in advance and in which the frequency at which the acquired data satisfies the criterion is low and with an increased number of instances only during a time period in which the frequency at which the acquired data satisfies the criterion is high.

Considering, for example, a case in which the acquired data is cumulative electricity usage (in kWh) for a time period that begins with the starting day of the month and ends with the current day and the criterion is for determining whether the acquired data exceeds a predetermined threshold. In this case, a likelihood that the criterion will satisfy in the early part of the month is lower than a likelihood that the criterion will satisfy in the middle or last part of the month. Thus, the server apparatus 1 can be operated with an even smaller number of instances in the early part of the month, so that the use charge of the instances can be reduced.

It is noted that, in the information processing system 100 in the first to third embodiments described above, the total number of groups is fixed to ten. The classification unit 11 may nonetheless dynamically determine the total number of groups. The classification unit 11 may change the number of groups to an appropriate number, for example, each time the determination processes by the group determination unit 13 and the individual determination unit 16 are performed.

The classification unit 11 may, for example, use a history of past determination processes to estimate a likelihood that the criterion will satisfy and, on the basis of the estimated likelihood, determine the total number of groups. When, for example, the number of groups for which the individual determination process has been performed is equal to or greater than a threshold, the classification unit 11 may perform a process (for decreasing the number of client apparatuses 2 belonging to one group) for increasing the total number of groups for a subsequent session onward. This is because of the following reason. Specifically, advance knowledge that the individual determination process is highly likely to be performed allows only a small benefit to be yielded from the performance of the determination process by the group determination unit 15. Thus, the classification unit 11 reduces the number of client apparatuses 2 belonging to one group to thereby reduce the likelihood that the individual determination process will be required, so that processing load can be reduced.

In contrast, when the likelihood that the individual determination process will be performed is known in advance to be low, the classification unit 11 may increase the number of client apparatuses 2 belonging to one group.

To change the total number of groups to 12, for example, the classification unit 11 defines the remainder obtained by dividing the device ID by 12 as the group ID of the group to which the client apparatus 2 identified by that device ID belongs.

The classification unit 11 may define the group ID without using the device ID. The classification unit 11 may, for example, estimate assignment of groups such that the number of individual determination processes performed is smaller, to thereby dynamically determine the group ID.

The classification unit 11 may, for example, arrange so that the client apparatuses 2 having similar criteria preferentially belong to the same group, to thereby associate the group ID with the device ID of each client apparatus. The criteria are similar when, for example, a difference in the thresholds included in the criteria is smaller than a predetermined value. The criteria may also be similar when types of criteria (e.g., "greater than", "smaller than", "equal to or greater than", and "equal to or smaller than") are similar. For example, a criterion for determining whether the acquired data is greater than a threshold is similar to a criterion for determining whether the acquired data is equal to or greater than a threshold.

The classification unit 11 may even arrange, for example, so that the client apparatuses 2 having similar acquired data preferentially belong to the same group, to thereby associate the group ID with the device ID of each client apparatus. The pieces of acquired data are similar when, for example, a difference in the acquired data acquired by different client apparatuses 2 is smaller than a predetermined value.

When the number of groups is changed, the representative criterion selection unit 14 reorganizes the representative criterion storage unit 114. Specifically, the representative criterion selection unit 14 selects, for each of new groups, a representative criterion from among the criteria for determining the acquired data acquired by the client apparatuses 2 that belong to the group.

Similarly, when the number of groups is changed, the representative acquired data selection unit 18 reorganizes the representative acquired data storage unit 115. Specifically, the representative acquired data selection unit 18 selects, for each of the new groups, representative acquired data from among the acquired data acquired by the client apparatuses 2 that belong to the group.

Fourth Embodiment

The following describes a fourth embodiment. The fourth embodiment will be described for a case in which one client apparatus 2 belongs to a plurality of groups. It is noted that only differences from the third embodiment will be described and descriptions of similarities will be omitted in the details of the fourth embodiment.

Descriptions for a functional configuration of the server apparatus 1 in the fourth embodiment, which are identical to the descriptions for the functional configuration of the server apparatus 1 in the third embodiment, will be omitted.

Group Classification Method

Figure 20:
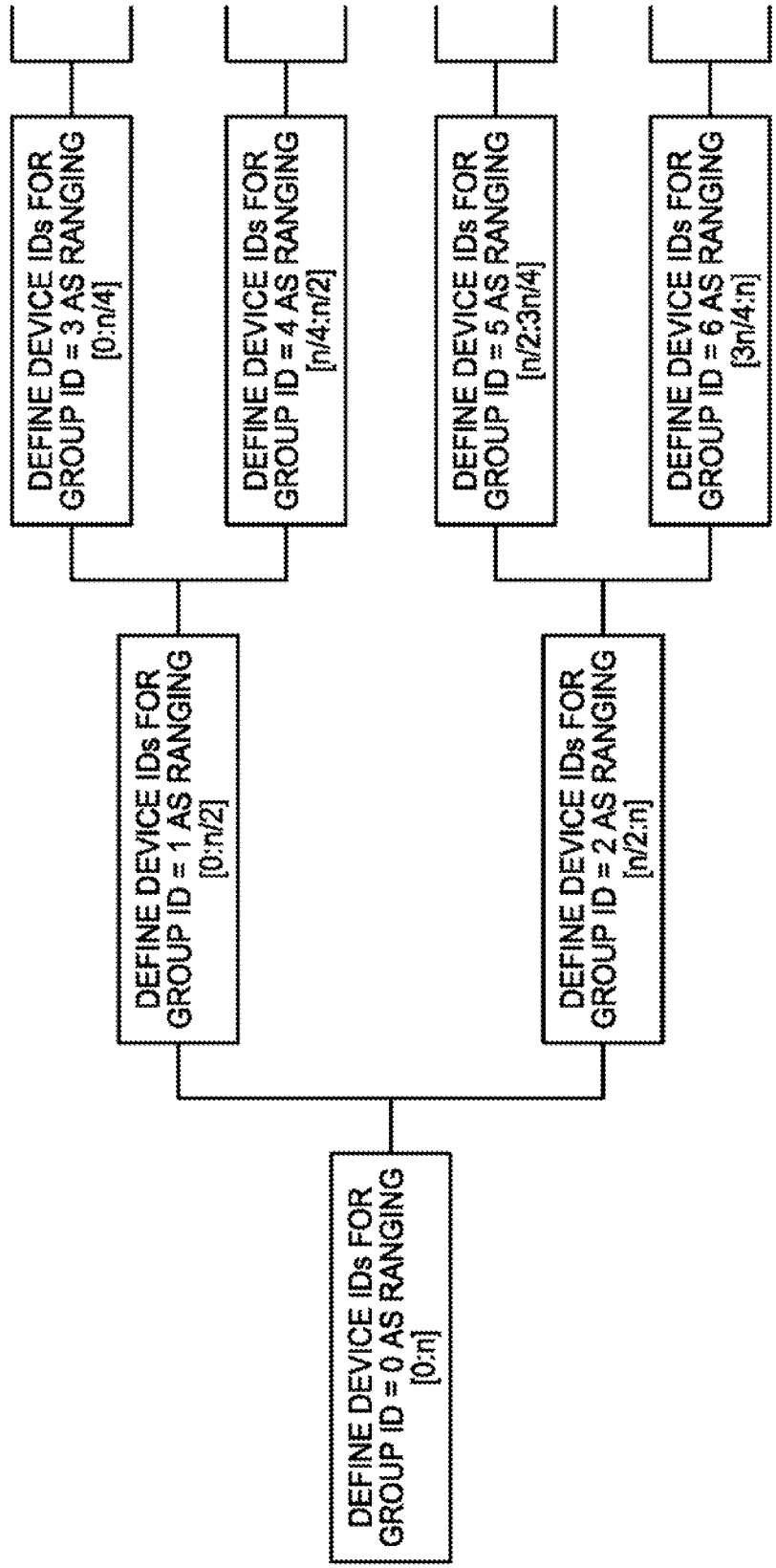
FIG. 20 is a diagram illustrating an exemplary group classification method in a fourth embodiment.

FIG. 20 is a diagram illustrating an exemplary group classification method in the fourth embodiment. The classification unit 11 defines group IDs for classifying the client apparatuses 2 on the basis of a range of device IDs that identify the client apparatuses 2. Specifically, the classification unit 11 repeatedly classifies the range [0:n] (0 or more and less than n) within which all of n device IDs can fall into two to thereby define the group IDs. The following exemplifies groups having group IDs from 0 to 6.

Group ID=0

The classification nit 11 defines the group ID for a group that includes client apparatuses 2 having device IDs ranging [0:n] as 0. Specifically, the group identified by a group ID of 0 includes all client apparatuses 2.

Group ID=1

The classification unit 11 defines the group ID for a group that includes client apparatuses 2 having device IDs ranging [0:n/2] as 1.

Group ID=2

The classification unit 11 defines the group ID for a group that includes client apparatuses 2 having device IDs ranging [n/2:n] as 2.

Group ID=3

The classification unit 11 defines the group ID for a group that includes client apparatuses 2 having device IDs ranging [0:n/4] as 3.

Group ID=4

The classification unit 11 defines the group ID for a group that includes client apparatuses 2 having device IDs ranging [n/4:n/2] as 4.

Group ID=5

The classification unit 11 defines the group ID for a group that includes client apparatuses 2 having device IDs ranging [n/2:3n/4] as 5.

Group ID=6

The classification unit 11 defines the group ID for a group that includes client apparatuses 2 having device IDs ranging [3n/4:n] as 6.

As described above, in the example illustrated in FIG. 20, one client apparatus 2 belongs to a plurality of groups. When a device ID and acquired data are received from the reception unit 12, the representative acquired data selection unit 18 selects the representative acquired data for each of all groups to which the client apparatus 2 identified by the device ID belongs. Similarly, when a device ID and acquired data are received from the reception unit 13, the representative criterion selection unit 14 selects the representative criterion for each of all groups to which the client apparatus 2 identified by the device ID belongs.

Determination Method

The following describes an exemplary determination method in the fourth embodiment.

Figure 21:
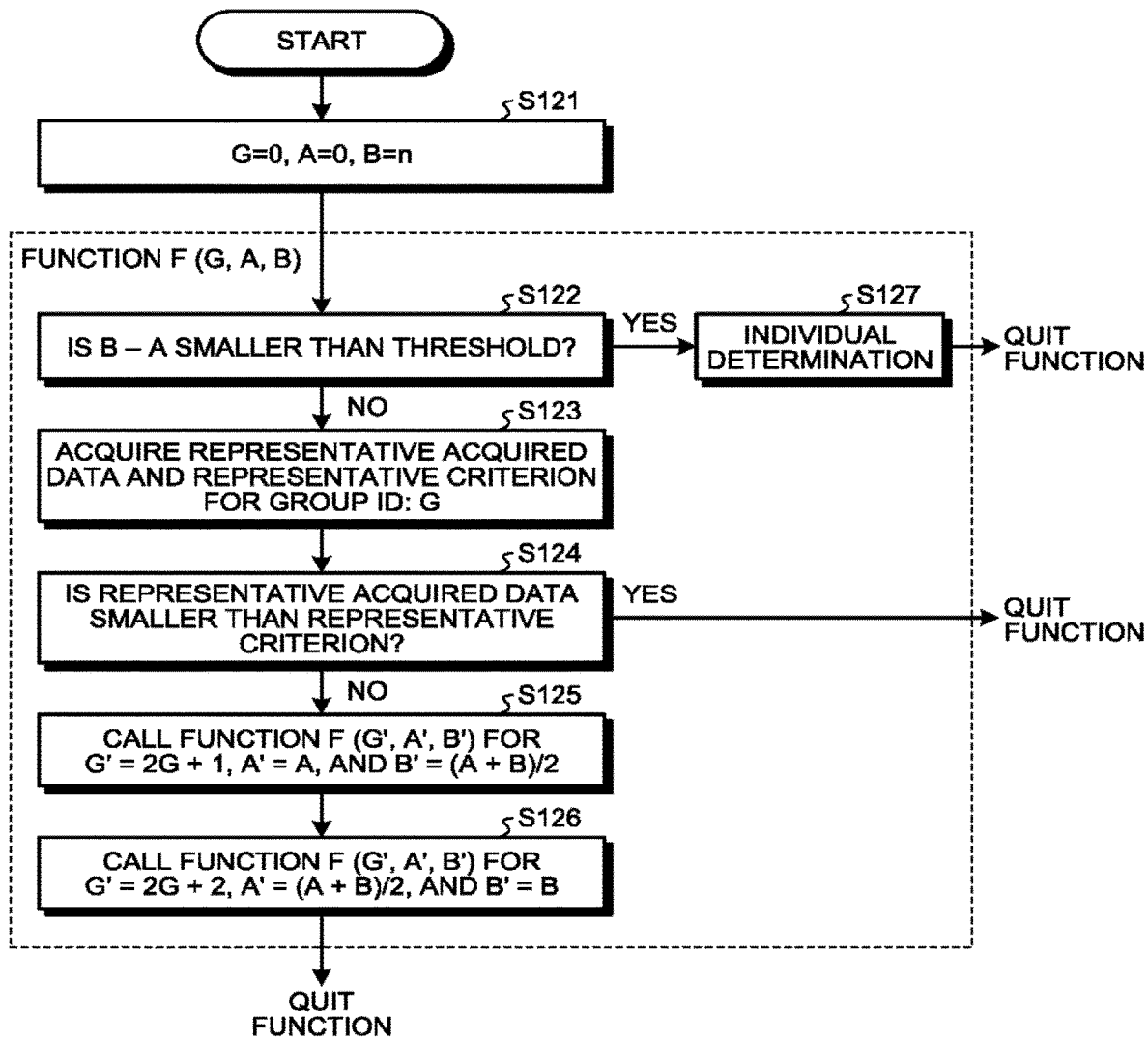
FIG. 21 is a flowchart illustrating an exemplary determination method in the fourth embodiment.

FIG. 21 is a flowchart illustrating the exemplary determination method in the fourth embodiment. FIG. 21 illustrates a case in which the determination method taken by the group determination unit 15 and the individual determination unit 16 in the fourth embodiment is implemented by recursively calling a function F (G, A, B). Where, G denotes a variable indicating the group ID and A and B denote a variable indicating a range [A:B] of the device ID. FIG. 21 assumes that the acquired data and the representative acquired data are ea h an instantaneous current amount (mA) and the criterion and the representative criterion are each a threshold of the instantaneous current amount.

The group determination unit 15 first sets default values of the function F as G=0, A=0, and B=n (Step S121).

The group determination unit 15 determines whether B minus A (B−A) is smaller than the threshold (Step 122). Specifically, the group determination unit 15 determines whether the number of client apparatuses 2 included in the group identified by a group ID of G is smaller than the threshold.

If B minus A (B−A) is determined to be smaller than the threshold (Yes at Step S122), the individual determination unit 16 performs the individual determination process (Step S127) and the function F (G, A, B) process is terminated.

If B minus A (B−A) is determined to be not smaller than the threshold (No at Step S122), the group determination unit 15 acquires from the representative acquired data storage unit 115 representative acquired data for the group ID of G and acquires from the representative criterion storage unit 114 a representative criterion for the group ID of G (Step S123).

The group determination unit 15 determines whether the representative acquired data smaller than the representative criterion (Step S124).

If the representative acquired data is determined to be smaller than the representative criterion (Yes at Step S124), the function F (G, A, B) process is terminated. Specifically, the acquired data of all client apparatuses 2 that belong to the group ID of G does not satisfy the criterion.

If the representative acquired data is determined to be not smaller than the representative criterion (No at Step S124), the group determination unit 15 reads a function F (G', A', B') for G'=2G+1, A'=A, and B'=(A+B)/2 (Step S125). Specifically, because the acquired data acquired by a client apparatus 2 included in a group G is likely to satisfy the criterion, a group G' that represents a first half range of the device IDs of the client apparatuses 2 included in the group G is subjected to the determination process.

The group determination unit 15 next reads a function F (G', A', B') for G'=2G+2, A'=(A+B)/2, and B'=B (Step S126). Specifically, because the acquired data acquired by a client apparatus 2 included in the group G is likely to satisfy the criterion, a group G' that represents a second half range of the device IDs of the client apparatuses 2 included in the group G is subjected to the determination process.

The completion of the process at Step S126 terminates the function F (G', A', B') process.

As described above, the information processing system 100 in the fourth embodiment determines whether the representative acquired data satisfies the representative criterion in multiple stages. This enables the information processing system 100 in the fourth embodiment to reduce the number of the individual determination processes even when, for example, acquired data satisfying the criterion is suddenly and unexpectedly acquired from a small number of client apparatuses 2.

The first to fourth embodiments have been described so as to make the determination on the assumption that the notification is performed when the value of the acquired data exceeds the threshold. This is, however, illustrative only and the notification may, for example, be performed when the acquired data value falls short of the threshold. In this case, the representative acquired data storage unit 115 retains a minimum value of the acquired data and the representative criterion storage unit 114 retains a maximum value of the threshold of the criterion.

The group determination unit 15 and the individual determination unit 16 in the first to fourth embodiments described above may be achieved by a single determination unit, instead of the two separate functional blocks.

Hardware Configuration of Server Apparatus

The following describes lastly an exemplary hardware configuration of the server apparatus 1 in the first to fourth embodiments.

Figure 22:
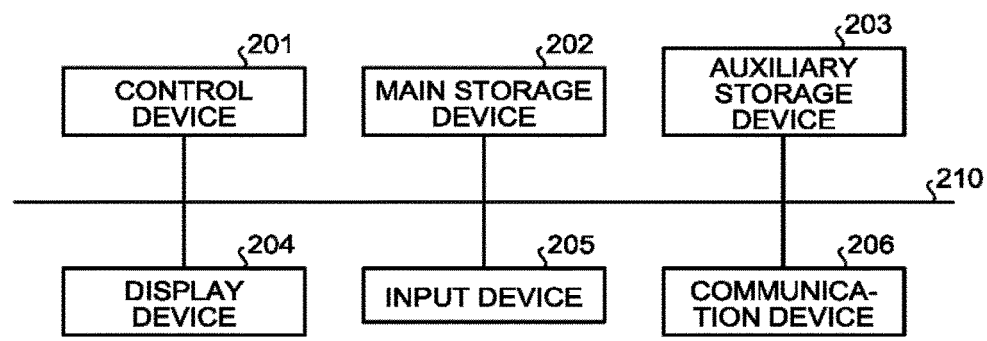
FIG. 22 is a diagram illustrating an exemplary hardware configuration of the server apparatus according to the first to fourth embodiment.

FIG. 22 is a diagram illustrating the exemplary hardware configuration of the server apparatus 1 according to the first to fourth embodiments. The server apparatus 1 in the embodiments includes a control device 201, a main storage device 202, an auxiliary storage device 203, a display device 204, an input device 205, and a communication device 206. The control device 201, the main storage device 202, the auxiliary storage device 203, the display device 204, the input device 205, and the communication device 206 are connected with each other via a bus 210.

The control device 201 executes a computer program loaded from the auxiliary storage device 203 onto the main storage device 202. The main storage device 202 is a memory such as a read only memory (ROM) and a random access memory (RAM). The auxiliary storage device 203 is a memory card or a hard disk drive (HDD).

The display device 204 displays information. The display device 204 is, for example, a liquid crystal display. The input device 205 receives an input of information. The input device 205 is, for example, a keyboard or a mouse. The display device 204 and the input device 205 may, for example, be a liquid crystal touch panel that offers both a display function and an input function. The communication device 206 communicates with other units.

A computer program executed by the server apparatus 1 in the first to fourth embodiments is provided as a computer program product by being stored in a computer-readable recording medium such as a CD-ROM, a memory card, a CD-R, and a digital versatile disc (DVD), as an installable or executable file.

The computer program executed by the server apparatus 1 in the first to fourth embodiments may be configured so as to be stored in a computer connected to a network such as the Internet and provided by being downloaded via the network. Furthermore, the computer program executed by the server apparatus 1 in the first to fourth embodiments may even be configured so as not to be downloaded, but to be provided via a network such as the Internet.

The computer program executed by the server apparatus 1 in the first to fourth embodiments may still be configured so as to be provided by being incorporated in, for example, a ROM in advance.

The computer program executed by the server apparatus 1 in the first to fourth embodiments has a modular configuration including functions that can be implemented by the computer program out of the functional configuration of the server apparatus 1 in the first to fourth embodiments.

The functions to be achieved by the computer program are loaded onto the main storage device 202 as a result of the control device 201 loading the computer program from a storage medium such as the auxiliary storage device 203 and executing the loaded computer program. Specifically, the functions to be implemented by the computer program are generated on the main storage device 202.

The functions of the server apparatus 1 in the first to fourth embodiments may be implemented, in part or in whole, by hardware such as an integrated circuit (IC).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A server apparatus comprising:
a memory that stores software instructions therein; and
one or more hardware processors electrically coupled to the memory and, by executing the software instructions, configured to perform:
first reception, to receive, from at least one first client apparatus, at least one piece of first reception data, each first reception data including:
identification information for identifying the first client apparatus; and
first acquired data that is acquired by the first client apparatus and that is corresponding to the identification information;
second reception, to receive, from at least one second client apparatus, at least one piece of second reception data, each second reception data including:
first criterion including a first threshold for determining the first acquired data, and
the identification information for identifying the first client apparatus that transmits the first acquired data determined by the first criterion;
group classification, to perform classifying of a plurality of first client apparatuses into one or more groups based on group information defined based on the identification information for identifying the first client apparatus;
second criterion selection, to select, as a second criterion for each of the one or more groups and from the first criterion that is used for determining the first acquired data received from at least one first client apparatus included in the group, a first criterion including a minimum first threshold among a plurality of first thresholds included in first criteria when the first criterion that is used for determining the first acquired data is a criterion for determining whether the first acquired data is greater than the first threshold, and a first criterion including a maximum first threshold among the plurality of first thresholds included in the first criteria when the first criterion that is used for determining the first acquired data is a criterion for determining whether the first acquired data is smaller than the first threshold;
first group determination, to determine whether at least one piece of first acquired data having being transmitted by at least one first client apparatus belonging to a group included in the one or more groups satisfies the second criterion selected in the second criterion selection for the group; and
first individual determination, to perform an individual determination process that determines whether the first acquired data satisfying the second criterion satisfies the first criterion that is received with the identification information of the first client apparatus that has transmitted the first acquired data satisfying the second criterion.

2. The server apparatus according to claim 1, wherein the one or more hardware processors are further configured to perform:
second acquired data selection, to select for each of the groups that is classified by the group classification and as second acquired data, first acquired data having a maximum value when the second criterion includes the minimum first threshold, and first acquired data having a minimum value when the second criterion includes the maximum first threshold, perform second group determination; to determine, for each of the groups that is classified by the group classification, whether the second acquired data satisfies the second criterion, and when the second acquired data satisfies the second criterion, perform second individual determination, to determine, for each first client apparatus included in a group for which the second acquired data satisfies the second criterion, whether the first acquired data received from the first client apparatus satisfies the first criterion received from the first client apparatus included in the group for which the second acquired data satisfies the second criterion.

3. The server apparatus according to claim 2, further comprising:
a first acquired data database implemented in the memory, configured to store the first acquired data therein; and
a second acquired data database implemented in the memory, configured to store the second acquired data therein, wherein
the second acquired data database has a read speed faster than a read speed of the first acquired data memory.

4. The server apparatus according to claim 2, wherein the one or more hardware processors are configured to
classify the first client apparatuses such that each of the first client apparatuses belongs to the one or more groups,
perform third group determination, to determine whether the second acquired data satisfies the second criterion for a group for which the second group determination is not performed, the group having a maximum number of first client apparatuses included in the group that is classified by the group classification and, when the second acquired data satisfies the second criterion, further determines whether the second acquired data satisfies the second criterion for a sub-group included in the group for which the second acquired data satisfies the second criterion, and
when the number of first client apparatuses included in the sub-group, for which the second acquired data satisfies the second criterion and which is lastly acquired by the third group determination, is smaller than a third threshold, perform the individual determination, to determine whether the first acquired data acquired by the first client apparatus included in the sub-group, for which the second acquired data satisfies the second criterion and which is lastly acquired by the third group determination, satisfies the first criterion.

5. The server apparatus according to claim 1, further comprising:
a first criterion database implemented in the memory, configured to store the first criterion therein; and
a second criterion database implemented in the memory, configured to store the second criterion therein, wherein
the second criterion database has a read speed faster than a read speed of the first criterion database.

6. The server apparatus according to claim 1, wherein the one or more hardware processors are further configured to perform:
notification, to notify a predetermined notification destination that, when the first acquired data satisfies the first criterion, the first criterion has been satisfied.

7. The server apparatus according to claim 1, wherein, when a number of groups that is classified by the group classification and that includes the first client apparatus, which is a target to be determined and which has transmitted the first acquired data, is equal to or greater than a second threshold, the one or more hardware processors increase the total number of groups.

8. The server apparatus according to claim 1, wherein the one or more hardware processors
receive the second reception data from second client apparatuses, and
determine a difference between the first thresholds included in each first criterion and
perform the group classification of the first client apparatuses such that first client apparatuses, which have the difference that is smaller than a given value, belong to a same group.

9. The server apparatus according to claim 1, wherein the one or more hardware processors
receive the first reception data from first client apparatuses and
determine a difference between two pieces of the first acquired data acquired by two different first client apparatuses of the first client apparatuses and
perform the group classification of the first client apparatuses such that first client apparatuses, which have the difference that is smaller than a given value, belong to a same group.

10. An information processing method, comprising:
receiving, as first reception, from at least one first client apparatus, at least one piece of first reception data, each first reception data including:
identification information for identifying the first client apparatus and
first acquired data that is acquired by the first client apparatus and that is corresponding to the identification information;
receiving, as second reception, from at least one second client apparatus, at least of one piece of second reception data, each second reception data including:
first criterion including a first threshold for determining the first acquired data, and
piece of the identification information for identifying the first client apparatus that transmits the first acquired data determined by the first criterion;
classifying, as group classification, a plurality of first client apparatuses into one or more groups based on group information defined based on the identification information for identifying the first client apparatus;
selecting, as a second criterion selection, for each of the one or more groups, and from the first criterion that is used for determining the first acquired data received from at least one first client apparatus included in the group, a first criterion including a minimum first threshold among a plurality of first thresholds included in first criteria, when the first criterion that is used for determining the first acquired data is a criterion for determining whether the first acquired data is greater than the first threshold, and a first criterion including a maximum first threshold among the plurality of first thresholds included in the first criteria when the first criterion that is used for determining the first acquired data is a criterion for determining whether the first acquired data is smaller than the first threshold;
determining, as a group determination, whether at least one piece of first acquired data having being transmitted by at least one first client apparatus belonging to a group included in the one or more groups satisfies the second criterion selected in the second criterion selection for the group; and
determining, as an individual determination, whether the first acquired data satisfying the second criterion satisfies the first criterion that is received with the identification information of the first client apparatus that has transmitted the first acquired data satisfying the second criterion.

11. A computer program product stored in a non-transitory computer-readable medium including a computer program causing a computer to perform:
first reception, to receive, from at least one first client apparatus, at least one piece of first reception data, each first reception data, including:
identification information for identifying the first client apparatus, and first acquired data that is acquired by the first client apparatus and that is corresponding to the identification information;

second reception, to receive, from at least one second client apparatus, at least one piece of second reception data, each second reception data including:
first criterion including a first threshold for determining the first acquired data, and
the identification information for identifying the first client apparatus that transmits the first acquired data determined by the first criterion;

group classification, to perform classifying of a plurality of first client apparatuses into one or more groups based on group information defined based on the identification information for identifying the first client apparatus;

second criterion selection, to select, for each of the one or more groups and from the first criterion that is used for determining the first acquired data received from at least one first client apparatus included in the group, a first criterion including a minimum first threshold among a plurality of first thresholds included in first criteria when the first criterion that is used for determining the first acquired data is a criterion for determining whether the first acquired data is greater than the first threshold, and a first criterion including a maximum first threshold among the plurality of first thresholds included in the first criteria when the first criterion that is used for determining the first acquired data is a criterion for determining whether the first acquired data is smaller than the first threshold;

group determination to determine whether at least one piece of first acquired data having being transmitted by at least one first client apparatus belonging to a group included in the one or more groups satisfies the second criterion selected in the second criterion selection for the group; and individual determination, to perform an individual determination process that determines whether the first acquired data satisfying the second criterion satisfies the first criterion that is received with the identification information of the first client apparatus that has transmitted the first acquired data satisfying the second criterion.

\* \* \* \* \*